US009604587B2

(12) United States Patent
Togura et al.

(10) Patent No.: US 9,604,587 B2
(45) Date of Patent: Mar. 28, 2017

(54) OCCUPANT POSITION DETECTION DEVICE AND AIRBAG DEPLOYMENT CONTROL SYSTEM

(71) Applicant: FUJIKURA LTD., Tokyo (JP)

(72) Inventors: Takeshi Togura, Sakura (JP); Shinsuke Nagahama, Sakura (JP); Yuki Noguchi, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/559,480

(22) Filed: Dec. 3, 2014

(65) Prior Publication Data

US 2015/0084317 A1  Mar. 26, 2015

Related U.S. Application Data

(63) Continuation of application No. PCT/JP2013/065508, filed on Jun. 4, 2013.

(30) Foreign Application Priority Data

Jun. 4, 2012 (JP) .................. 2012-127452
Jun. 4, 2012 (JP) .................. 2012-127454

(Continued)

(51) Int. Cl.
*B60R 21/015* (2006.01)
*B60R 21/26* (2011.01)
(Continued)

(52) U.S. Cl.
CPC ...... *B60R 21/015* (2013.01); *B60R 21/01532* (2014.10); *B60R 21/26* (2013.01); *G01B 7/003* (2013.01); *G01B 7/14* (2013.01)

(58) Field of Classification Search
CPC .......... G01B 7/003; G01B 7/023; G01B 7/14; B60R 21/26; B60N 2/002; B60N 2/0244; B60N 2002/0268; B60N 2002/0272
See application file for complete search history.

(56) References Cited

U.S. PATENT DOCUMENTS 5,722,686 A    3/1998  Blackburn et al.
5,844,486 A *  12/1998 Kithil ................ B60N 2/002
                                                280/735

(Continued)

FOREIGN PATENT DOCUMENTS

JP    9-309374 A     12/1997
JP    2000-355264 A  12/2000

(Continued)

OTHER PUBLICATIONS

Office Action dated Jul. 28, 2015, issued in counterpart Japanese application No. 2014-520017. (3 pages).

(Continued)

*Primary Examiner* — Thomas G Black
*Assistant Examiner* — Ce Li
(74) *Attorney, Agent, or Firm* — Westerman, Hattori, Daniels & Adrian, LLP

(57) ABSTRACT

An occupant position detection device is an occupant position detection device disposed inside a vehicle to detect a position of an occupant, and includes: a detector comprising two or more sensor electrodes disposed forward of a seat and at least one sensor electrode disposed at a position more rearward and higher than these sensor electrodes, the detector respectively outputting a detection signal based on a distance between each of the sensor electrodes and the occupant; and a computation unit inputted with the detection signal to compute an occupant position. The computation unit selects from the detection signals outputted from the detector three or more types of combinations configured (Continued)

from two of the detection signals, calculates a ratio or difference for each of these combinations of detection signals, and computes the occupant position based on the three or more calculated ratios or differences of the detection signals.

15 Claims, 18 Drawing Sheets

(30) Foreign Application Priority Data

Jun. 4, 2012 (JP) ................................. 2012-127456
Jun. 4, 2012 (JP) ................................. 2012-127458

(51) Int. Cl.
*G01B 7/00* (2006.01)
*G01B 7/14* (2006.01)

(56) References Cited

U.S. PATENT DOCUMENTS

| | | | |
|---|---|---|---|
| 5,871,232 A | 2/1999 | White | |
| 5,991,676 A * | 11/1999 | Podoloff | G01G 19/4142 177/144 |
| 6,220,627 B1 * | 4/2001 | Stanley | B60R 21/015 180/272 |
| 6,275,146 B1 * | 8/2001 | Kithil | B60N 2/002 180/272 |
| 7,436,299 B2 * | 10/2008 | Shieh | G01B 7/14 180/271 |
| 8,676,447 B2 * | 3/2014 | Togura | B60R 21/01 280/735 |
| 8,878,553 B2 * | 11/2014 | Yamaguchi | B60N 2/002 180/273 |
| 2011/0313622 A1 * | 12/2011 | Togura | B60R 21/01 701/45 |

FOREIGN PATENT DOCUMENTS

| | | |
|---|---|---|
| JP | 2001-294117 A | 10/2001 |
| JP | 2002-513352 A | 5/2002 |
| JP | 4122417 B2 | 7/2008 |
| JP | 2010-54350 A | 3/2010 |
| JP | 2010-175443 A | 8/2010 |
| JP | 2010-238642 A | 10/2010 |
| JP | 2011-137751 A | 7/2011 |
| JP | 2012-011803 A | 1/2012 |
| WO | 97/39920 A1 | 10/1997 |

OTHER PUBLICATIONS

International Search Report dated Sep. 10, 2013, issued in corresponding application No. PCT/JP2013/065508.

* cited by examiner

FIG. 11

| Area Name | Combination of Sensors | Sensitivity of Sensor |
|---|---|---|
| Area au | Plane 1: Sensor 11-Sensor 12 | Low |
| | Plane 2: Sensor 11-Sensor 13 | |
| | Plane 3: Sensor 11-Sensor 14 | |
| Area ad | Plane 1: Sensor 11-Sensor 12 | High |
| | Plane 2: Sensor 11-Sensor 13 | |
| | Plane 3: Sensor 11-Sensor 14 | |
| Area bu | Plane 1: Sensor 11-Sensor 13 | Low |
| | Plane 2: Sensor 11-Sensor 14 | |
| | Plane 3: Sensor 12-Sensor 14 | |
| Area bd | Plane 1: Sensor 11-Sensor 13 | High |
| | Plane 2: Sensor 11-Sensor 14 | |
| | Plane 3: Sensor 12-Sensor 14 | |
| Area cu | Plane 1: Sensor 11-Sensor 12 | Low |
| | Plane 2: Sensor 11-Sensor 14 | |
| | Plane 3: Sensor 12-Sensor 14 | |
| Area cd | Plane 1: Sensor 11-Sensor 12 | High |
| | Plane 2: Sensor 11-Sensor 14 | |
| | Plane 3: Sensor 12-Sensor 14 | |
| Area du | Plane 1: Sensor 11-Sensor 13 | Low |
| | Plane 2: Sensor 11-Sensor 14 | |
| | Plane 3: Sensor 12-Sensor 14 | |
| Area dd | Plane 1: Sensor 11-Sensor 13 | High |
| | Plane 2: Sensor 11-Sensor 14 | |
| | Plane 3: Sensor 12-Sensor 14 | |

OCCUPANT POSITION DETECTION DEVICE AND AIRBAG DEPLOYMENT CONTROL SYSTEM

CROSS REFERENCE TO RELATED APPLICATIONS

This application is a continuation application of PCT application No. PCT/JP2013/065508, filed on Jun. 4, 2013, which is based on and claims the benefit of priorities from prior Japanese Patent Applications No. 2012-127452, filed on Jun. 4, 2012, No. 2012-127454, filed on Jun. 4, 2012, No. 2012-127456, filed on Jun. 4, 2012, No. 2012-127458, filed on Jun. 4, 2012, the entire contents of which are incorporated herein by reference.

BACKGROUND OF THE INVENTION

Field of the Invention

The present invention relates to an occupant position detection device disposed inside a vehicle to detect a position of an occupant, and an airbag deployment control system for the vehicle.

Description of the Related Art

Conventionally known in deployment control of an airbag is an airbag deployment control system that employs an occupant position detection device disposed inside a vehicle to detect a position of an occupant, for reducing an impact to a human body by deployment of the airbag. As a method for detecting the position of the occupant there is the likes of a method that, based on, for example, a geometrical positional relationship between three or more proximity sensors and a head position of the occupant, employs a trigonometric algorithm to detect the head position (Japanese Patent No. 4122417).

In the above-mentioned conventional occupant position detection device, there is a risk of a misdetection or an incorrect operation occurring due to a variety of factors. The present invention was made in view of such points and has an object of providing a highly reliable occupant position detection device and airbag deployment control system.

SUMMARY OF THE INVENTION

An occupant position detection device according to the present invention is an occupant position detection device disposed inside a vehicle to detect a position of an occupant, and includes: a first detector comprising two or more sensor electrodes disposed forward of a seat and at least one sensor electrode disposed at a position more rearward and higher than these sensor electrodes, the first detector respectively outputting a detection signal based on a distance between each of the sensor electrodes and the occupant; and a computation unit inputted with the detection signal to compute an occupant position. The computation unit selects from each of the detection signals outputted from the first detector three or more types of combinations configured from two of the detection signals, calculates a ratio or difference for each of these combinations of detection signals, and computes the occupant position based on the three or more calculated ratios or differences of the detection signals. Moreover, instead of performing calculation and computation based on the ratio or difference of the detection signals, a part or all thereof may be substituted by table data or its equivalent.

In the above-mentioned conventional occupant position detection device, a geometrical position is calculated based on an absolute distance from the head to each of sensor electrodes using the trigonometric algorithm. However, the absolute distance outputted from each of the sensors ends up changing depending on temperature or humidity, hence accurate detection of the head position sometimes becomes difficult depending on an environment. However, this kind of method makes it possible to provide an occupant position detection device capable of detecting the position of the human body without depending on temperature or humidity. Note that the above-described two or more sensor electrodes disposed forward of the seat may include: at least one sensor electrode disposed on a forward left side of the seat; and at least one sensor electrode disposed on a forward right side of the seat. Furthermore, there may be disposed on the forward left side or the forward right side of the seat two or more sensor electrodes whose height position or forward-rearward position are different.

In an embodiment of the present invention, a region for detecting the position of the occupant is divided into a plurality of areas, and the computation unit specifies the area where the occupant is positioned from among the plurality of areas based on the detection signal, determines a condition of computation of the occupant position based on the specified area, and selects from each of the detection signals outputted from the first detector three or more types of combinations configured from two of the detection signals, based on the determined condition, calculates a ratio or difference for each of these combinations of detection signals, and computes the occupant position based on the three or more calculated ratios or differences of the detection signals.

In the above-mentioned conventional occupant position detection device, detection precision sometimes ends up lowering when the head position to be detected is too far from or excessively too close to the sensor. However, this kind of method makes it possible to provide an occupant position detection device capable of detecting the occupant position with high precision regardless of distance from the sensor.

In an embodiment of the present invention, only in the case that the detection signal or a physical quantity found from the detection signal is in a certain range, does the computation unit employ said detection signal to compute the occupant position.

In the above-mentioned conventional occupant position detection device, it sometimes happened that when a hand or luggage, and so on, of the occupant approached or contacted any of the sensors disposed inside an automobile, an output of the sensor ended up exceeding a detectable range and the position of the occupant ended up being misdetected. However, this kind of method makes it possible to provide a highly reliable occupant position detection device in which occurrence of a misdetection is suppressed.

The occupant position detection device according to an embodiment of the present invention further comprises a second detector disposed on at least one of a seatback surface and a seating surface and outputting a second detection signal. The computation unit detects the position and a posture of the occupant based on the detection signal and the second detection signal.

In an embodiment of the present invention, the above-described computation unit detects the position of the occupant based on the detection signal, and detects the posture of the occupant based on the detection signal and the second detection signal. Moreover, it is also possible for the above-described computation unit to determine whether the position of the occupant is a position of a head of the occupant or not, based on the posture of the occupant.

In the above-mentioned conventional occupant position detection device, there was a risk that when a position of the hand of the occupant approaches the sensor, the position of the hand of the occupant ends up being recognized as the head position of the occupant, causing an incorrect operation. However, this kind of method makes it possible to provide a highly reliable occupant position detection device capable of preventing a misdetection.

An airbag deployment control system according to the present invention comprises: any of the above-described occupant position detection devices; an airbag disposed in a range in which an occupant position is detectable by the occupant position detection device, to deploy during a collision of a vehicle; and an airbag deployment control device that performs deployment control of the airbag according to an output signal of the occupant position detection device.

The present invention makes it possible to provide a highly reliable occupant position detection device and airbag deployment control system.

BRIEF DESCRIPTION OF THE DRAWINGS

FIG. 11 is a table showing conditions of a computation method of an occupant position, according to the same embodiment.

DETAILED DESCRIPTION OF THE EMBODIMENTS

First Embodiment

Next, an occupant position detection device and an airbag deployment control system for a vehicle, according to a first embodiment of the present invention, will be described in detail.

[Overall Configuration]

Figure 1:
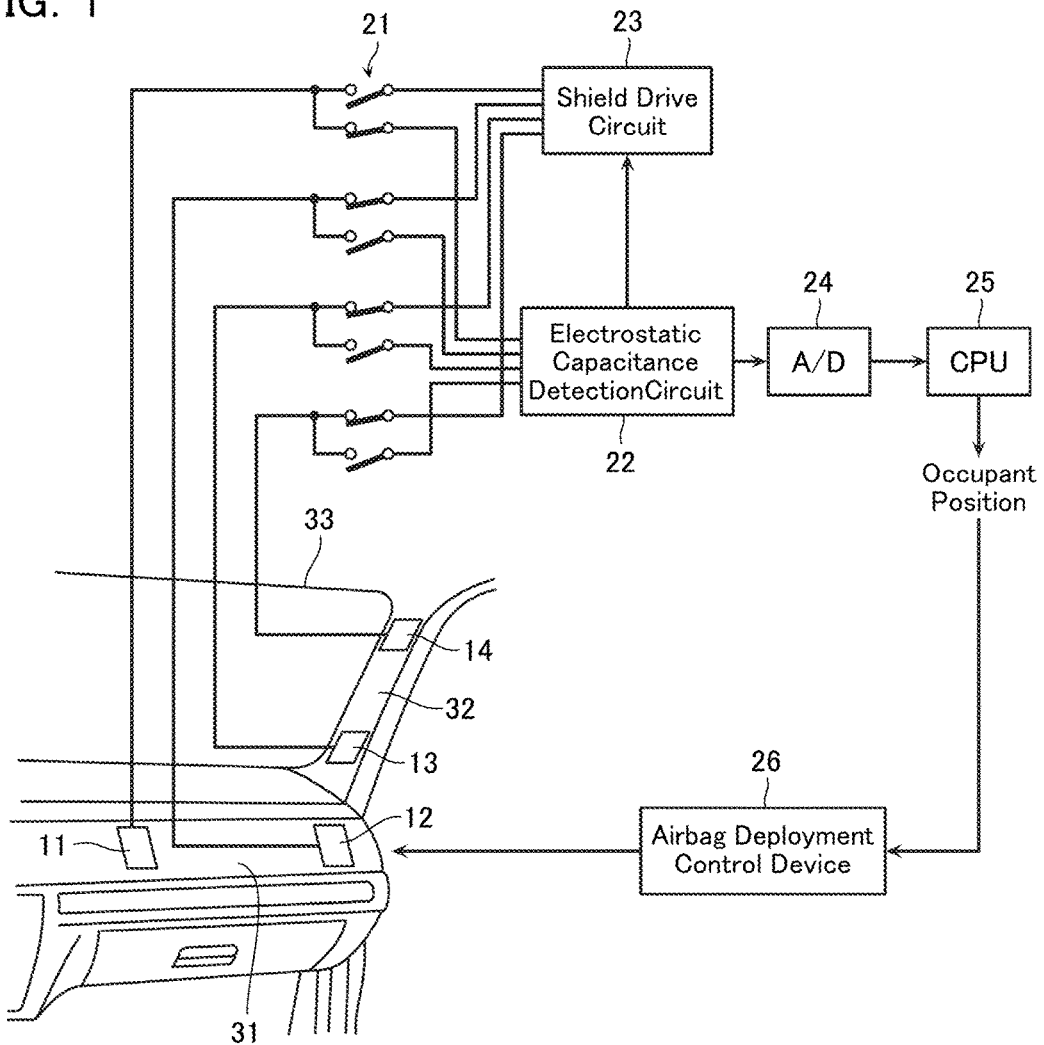
FIG. 1 is a block diagram showing a configuration of an occupant position detection device and an airbag deployment control system according to a first embodiment of the present invention.

FIG. 1 is a view showing a configuration of the occupant position detection device and the airbag deployment control system according to the present embodiment. Note that in the description below, "forward" and "rearward" mean a forward-rearward orientation when facing in a traveling direction of a vehicle body, and "left side" and "right side" mean a left-right orientation with respect to a seat center when facing in the traveling direction of the vehicle body. As a detector, the occupant position detection device according to the present embodiment comprises: a sensor electrode 11 disposed on the left side of an instrument panel 31 forward of a driving seat or a passenger seat; a sensor electrode 12 disposed on the right side of the instrument panel 31; a sensor electrode 13 installed in a lower portion of a pillar 32 diagonally forward of the driving seat or the passenger seat; and a sensor electrode 14 installed in an upper portion of the pillar 32. The sensor electrodes 11 to 14 configure an electrostatic capacitance type sensor, detect a change in electrostatic capacitance between, for example, a head position of an occupant and the sensor electrodes 11 to 14, and output the change as a detection signal.

The sensor electrodes 11 to 14 are connected and inputted to an electrostatic capacitance detection circuit 22 and a shield drive circuit 23 via switches 21. The switches 21 connect one of the sensor electrodes 11 to 14 to the electrostatic capacitance detection circuit 22, and the remaining three of the sensor electrodes 11 to 14 to the shield drive circuit 23. Note that the switches 21 may be controlled by a CPU, and may also be switched according to a clock of the electrostatic capacitance detection circuit 22. The shield drive circuit 23 prevents a capacitance from being generated between the sensor electrode in the middle of capacitance detection and the other three of the sensor electrodes by setting a potential of the three sensor electrodes connected to the shield drive circuit 23 to the same potential as a potential of the sensor electrode connected to the electrostatic capacitance detection circuit 22. The above-described configuration results in the detection signals outputted from the sensor electrodes 11 to being processed by time division by one electrostatic capacitance detection circuit 22.

An A/D conversion circuit 24 converts the detection signal detected by the electrostatic capacitance detection circuit 22 to digital information, and inputs the converted detection signal to a computation unit 25 (CPU). The computation unit 25 calculates a ratio or difference of three or more groups of two detection signals, from the four inputted detection signals, computes an occupant position based on the three or more ratios or differences between the detection signals, and outputs the occupant position.

The occupant position outputted from the computation unit 25 is inputted to an airbag deployment control device 26. The airbag deployment control device 26 performs deployment control of an airbag not illustrated housed in the likes of the instrument panel 31, a steering center, a pillar, a door, and so on, not illustrated, based on the occupant position outputted from the computation unit 25 and an output of the likes of an acceleration sensor not illustrated. For example, it is possible for deployment of the airbag to not be performed when a distance between the head position of the occupant and the airbag is within a certain range and for deployment of the airbag to be performed when the distance between the head position of the occupant and the airbag is outside of the certain range, and it is also possible to control a position of the deploying airbag or a momentum when the airbag deploys, based on the head position of the occupant.

[Operation]

Next, operation of the occupant position detection device according to the present embodiment will be described. Note that below, electrostatic capacitances detected by the sensor electrodes 11 to 14 are assumed to be C11 to C14. In the present embodiment, an absolute value of the electrostatic capacitances C11 to C14 is employed as the detection signal, but it is also possible to perform computation processing adopting as the detection signal a differential between electrostatic capacitances C11' to C14' when the occupant is not or when the occupant is assumed to be not within an occupant position detectable range of the sensor electrodes 11 to 14, and the electrostatic capacitances C11 to C14 when the occupant is assumed to be within the occupant position detectable range of the sensor electrodes 11 to 14. Note that a variety of methods can be applied as an acquisition method of the electrostatic capacitances C11' to C14', such as acquiring when the occupant is not or when the occupant is assumed to be not within the occupant position detectable range of the sensor electrodes 11 to 14, measuring as a trigger a vehicle signal such as a signal when the occupant has opened a key from outside in conjunction with keyless entry or a signal when the door has opened, using a value at a time of shipment, and so on.

Figure 2:
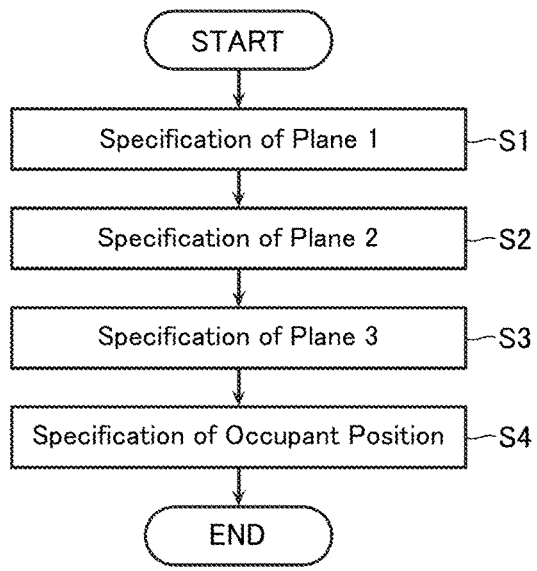
FIG. 2 is a flowchart for explaining an occupant position detection method according to the same embodiment.
Figure 3A:
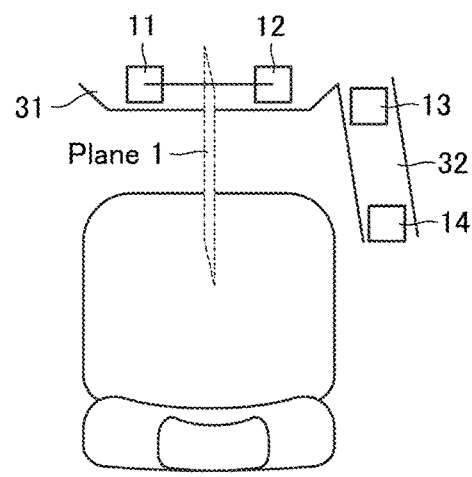
FIG. 3A-FIG. 3C are schematic views for explaining the occupant position detection method according to the same embodiment.
Figure 3B:
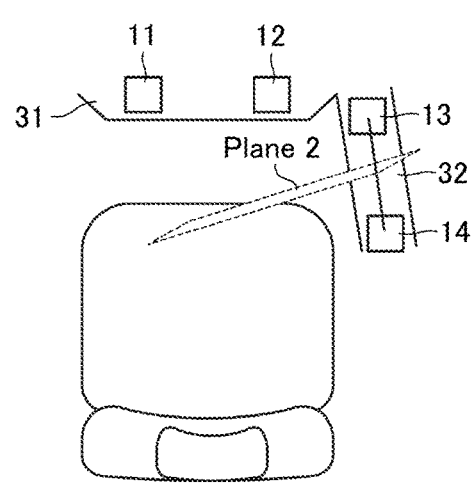
Figure 3C:
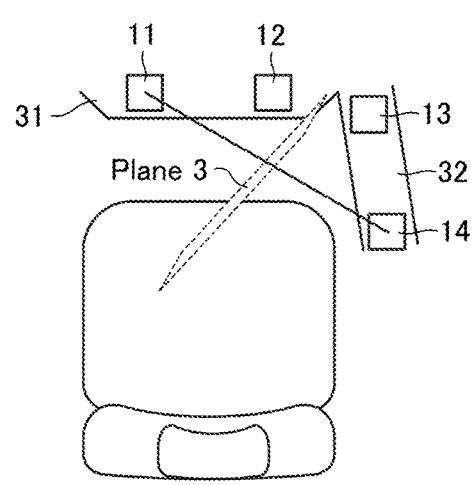

FIG. 2 is a flowchart, and FIGS. 3A-3C and 4 are plan views, for explaining operation of the occupant position detection device according to the present embodiment. In the present embodiment, the computation unit 25 first calculates a ratio $\alpha 1 = C11/C12$ of electrostatic capacitance between the sensor electrode 11 disposed on the left side of the instrument panel 31 and the sensor electrode 12 disposed on the right side of the instrument panel 31, and as shown in FIG. 3A, specifies a plane 1 which is a set of points where $\alpha 1$ holds (step S1). Next, the computation unit 25 calculates a ratio $\alpha 2 = C13/C14$ of electrostatic capacitance between the sensor electrode 13 disposed in the lower portion of the pillar and the sensor electrode 14 disposed in the upper portion of the pillar, and as shown in FIG. 3B, specifies a plane 2 which is a set of points where $\alpha 2$ holds (step S2). Next, the computation unit 25 calculates a ratio $\alpha 3 = C11/C14$ of electrostatic capacitance between the sensor electrode 11 disposed on the left side of the instrument panel and the sensor electrode 14 disposed in the upper portion of the pillar, and as shown in FIG. 3C, specifies a plane 3 which is a set of points where $\alpha 3$ holds (step S3). In steps S1 to S3, if the head of the occupant approaches the sensor electrodes of a numerator side of $\alpha 1$ to $\alpha 3$ (C11, C13, and C11), then $\alpha 1$ to $\alpha 3$ become larger, and if the head of the occupant approaches the sensor electrodes of a denominator side of $\alpha 1$ to $\alpha 3$ (C12, C14, and C14), then $\alpha 1$ to $\alpha 3$ become smaller, hence a position of plane 1 to plane 3 can be inferred from a value of $\alpha 1$ to $\alpha 3$.

Figure 4:
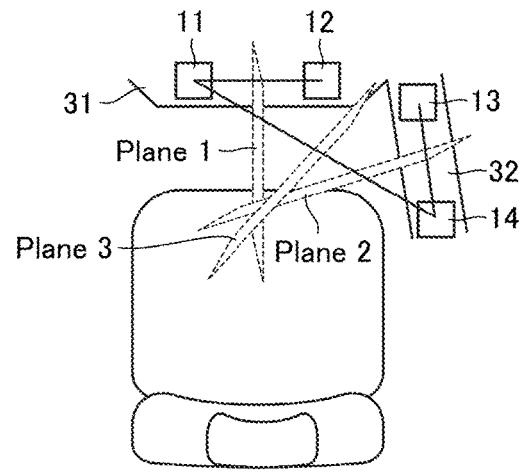
FIG. 4 is a schematic view for explaining the occupant position detection method according to the same embodiment.

Next, as shown in FIG. 4, the computation unit 25 calculates as the head position of the occupant an intersection point where plane 1 to plane 3 intersect, that is, an intersection point where $\alpha 1$ to $\alpha 3$ all hold (step S4). That is, if plane 1 to plane 3 are expressed by functions whose arguments are $\alpha 1$ to $\alpha 3$ and x, y, and z coordinates of the head position, then plane 1 is expressed by $a1(\alpha 1)x + b1(\alpha 1)y + c1(\alpha 1)z + d1(\alpha 1) = 0$, plane 2 is expressed by $a2(\alpha 2)x + b2(\alpha 2)y + c2(\alpha 2)z + d2(\alpha 2) = 0$, and plane 3 is expressed by $a3(\alpha 3)x + b3(\alpha 3)y + c3(\alpha 3)z + d3(\alpha 3) = 0$. Now, a1 to a3, b1 to b3, c1 to c3 and d1 to d3 are functions whose arguments are $\alpha 1$ to $\alpha 3$, and are determined by a positional relationship of the sensor electrodes, and so on. The $\alpha 1$ to $\alpha 3$ are uniquely determined from electrostatic capacitance values C11 to C14 detected with respect to an arbitrary head position of the occupant, hence the coordinates x, y, and z can be calculated by solving equations of the three planes as three-dimensional simultaneous equations.

When temperature change or humidity change occurs, the electrostatic capacitance values C11 to C14 detected from the sensor electrodes 11 to 14 change uniformly. The occupant position detection device according to the present embodiment finds $\alpha 1$ to $\alpha 3$ by ratios of the electrostatic capacitance values C11 to C14, hence cancels out factors such as temperature change or humidity change, and so on, and is capable of detecting the head position of the occupant with good precision. Note that in the present embodiment, it was assumed that $\alpha 1 = C11/C12$, $\alpha 2 = C13/C14$, and $\alpha 3 = C11/C14$, but $\alpha 1$ to $\alpha 3$ need only be factors capable of canceling out temperature change or humidity change, and it is possible, for example, to set $\alpha 1 = C11/(C11+C12)$, $\alpha 1 = C11 - C12$, $\alpha 1 = (C11 - C12)/C12$, and so on. Moreover, if vehicle signals such as a seat belt reminder or a seated signal, and so on, are incorporated and conditions when not seated or conditions when a seat belt is not fastened are introduced, then an even more complex situation can be discriminated.

Second Embodiment

Figure 5:
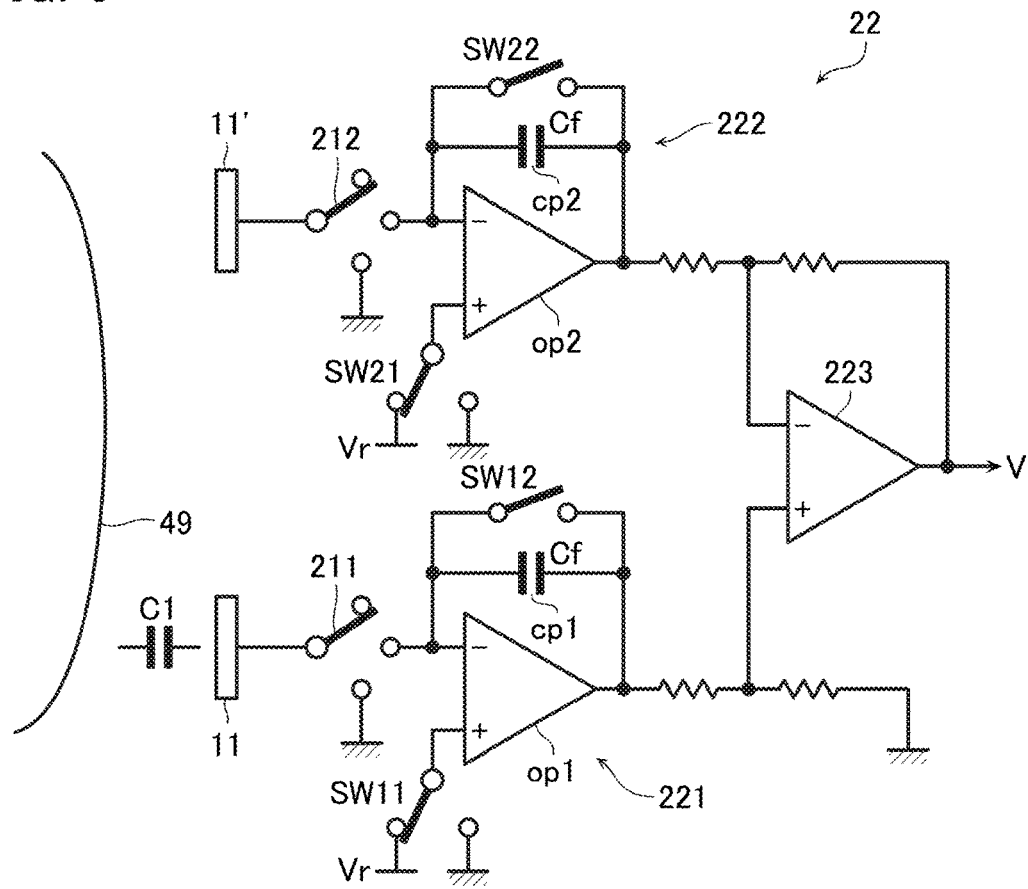
FIG. 5 is a circuit diagram showing a configuration of an electrostatic capacitance detection circuit according to a second embodiment of the present invention.

Next, an occupant position detection device according to a second embodiment of the present invention will be described. The occupant position detection device according to the present embodiment is basically similar to that of the first embodiment. However, in the present embodiment, as shown in FIG. 5, a differential type C-V conversion circuit is adopted as the electrostatic capacitance detection circuit 22. The differential type C-V conversion circuit is capable of eliminating common mode noise, and can cancel temperature characteristics, and so on, within the circuit.

In the present embodiment, the electrostatic capacitance detection circuit 22 includes: a first differential amplifier unit 221 that inputs and outputs as a first detection signal electrostatic capacitance between a human body 49 and the sensor electrode 11; a second differential amplifier unit 222 that inputs and outputs as a second detection signal electrostatic capacitance of a sensor electrode 11' shielded to not detect electrostatic capacitance with the human body 49; and a differential amplifier 223 that outputs a difference between the first detection signal outputted from the first differential amplifier unit 221 and the second detection signal outputted from the second differential amplifier unit 222. Note that below, the case where the sensor electrode 11 is connected to the first differential amplifier unit 221 will be described, but the first differential amplifier unit 221 may be connected to each of the sensor electrodes 11 to 14, via the switch 21.

In a reset state, the sensor electrodes 11 and 11' are grounded via switches 211 and 212. Similarly, non-inverting input terminals of a differential amplifier op1 included in the first differential amplifier unit 221 and a differential amplifier op2 included in the second differential amplifier unit 222 are respectively grounded via switches sw11 and sw21, and switches sw12 and sw22 attain an on state. As a result, charge of the sensor electrodes 11 and 11', and charge transfer-dedicated capacitors cp1 and cp2 are discharged.

In order to start detection of the first detection signal by the electrostatic capacitance detection circuit 22, the switches 211 and 212 are connected to inverting input terminals of the differential amplifiers op1 and op2, the switches sw12 and sw22 are set to an off state, and the switches sw11 and sw21 are connected to a reference voltage source. As a result, the non-inverting input terminals of the differential amplifiers op1 and op2 are applied with a reference voltage Vr via the switches sw11 and sw21, hence the sensor electrodes 11 and 11' are respectively charged with charges of Q1=C1Vr and Q2=C2Vr. Now, C1 is electrostatic capacitance between the human body 49 and the sensor electrode 11, and C2 is electrostatic capacitance of the sensor electrode 11' not depending on the human body 49.

Next, the switches 211 and 212 are set to an OFF state, and the switches sw11 and sw21 are grounded. As a result, the charges Q1 and Q2 charged in the inverting input terminals of the differential amplifiers op1 and op2 move to the capacitors cp1 and cp2 of electrostatic capacitance Cf, and voltages VrC1/Cf and VrC2/Cf are respectively outputted from output terminals of the differential amplifiers op1 and op2.

The voltage VrC2/Cf outputted from the output terminal of the differential amplifier op2 does not include information of a distance between the human body 49 and the sensor electrode 11', and includes only error information of the sensor depending on the likes of temperature or humidity.

The differential amplifier 223 eliminates from the output voltage VrC1/Cf of the differential amplifier op1 that includes information of the distance between the human body 49 and the sensor electrode 11' and error information of the sensor depending on the likes of temperature or humidity, the output voltage VrC2/Cf of the differential amplifier op2 that includes only error information of the sensor depending on the likes of temperature or humidity, to output Vr(C2−C1)/Cf. Note that in the above description, explanation was given assuming that an amplification degree of the differential amplifier 223, the differential amplifier op1, and the differential amplifier op2 is 1, but the amplification degree can be appropriately adjusted.

Third Embodiment

Next, an occupant position detection device according to a third embodiment of the present invention will be described. The occupant position detection device according to the present invention is configured substantially similarly to the occupant position detection devices according to the first and second embodiments. However, in the present embodiment, the computation unit 25 inputs a detection signal converted to digital information to compute the occupant position by a later-mentioned method, and output the occupant position.

Figure 6:
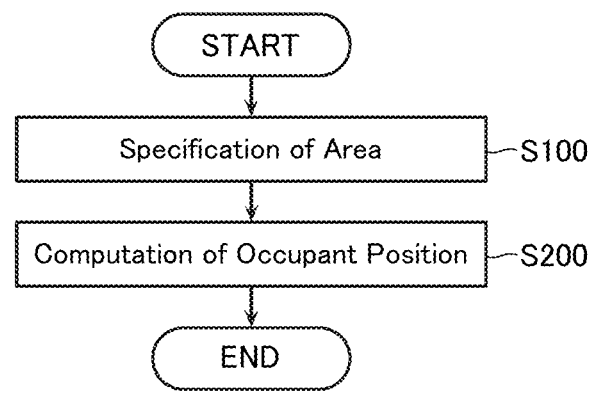
FIG. 6 is a flowchart for explaining an occupant position detection method according to a third embodiment of the present invention.

Operation of the occupant position detection device according to the present embodiment will be described. FIG. 6 is a flowchart for explaining operation of the occupant position detection device according to the present embodiment. In the present embodiment, the computation unit 25 divides a region for detecting the position of the occupant into a plurality of areas, specifies the area where the occupant is positioned based on the detection signal (step S100), computes the occupant position by a condition determined based on the specified area, and outputs the occupant position (step S200).

[Division of Areas]

In the present embodiment, the region for detecting the position of the occupant is divided into the plurality of areas. Division of the areas is performed for setting a later-mentioned condition of computation. In the present embodiment, suitable conditions of computation in each of the areas are pre-stored in a memory device not illustrated, and the computation unit 25 specifies the area where the occupant is positioned, and selects the suitable condition according to the specified area.

Figure 9:
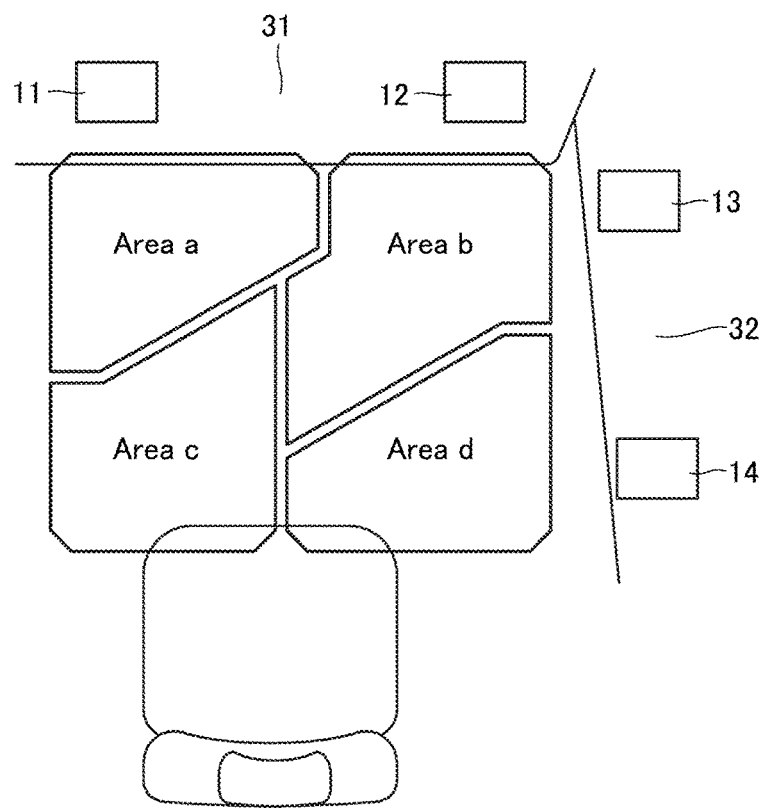
FIG. 9 is a schematic view for explaining the same method.
Figure 10:
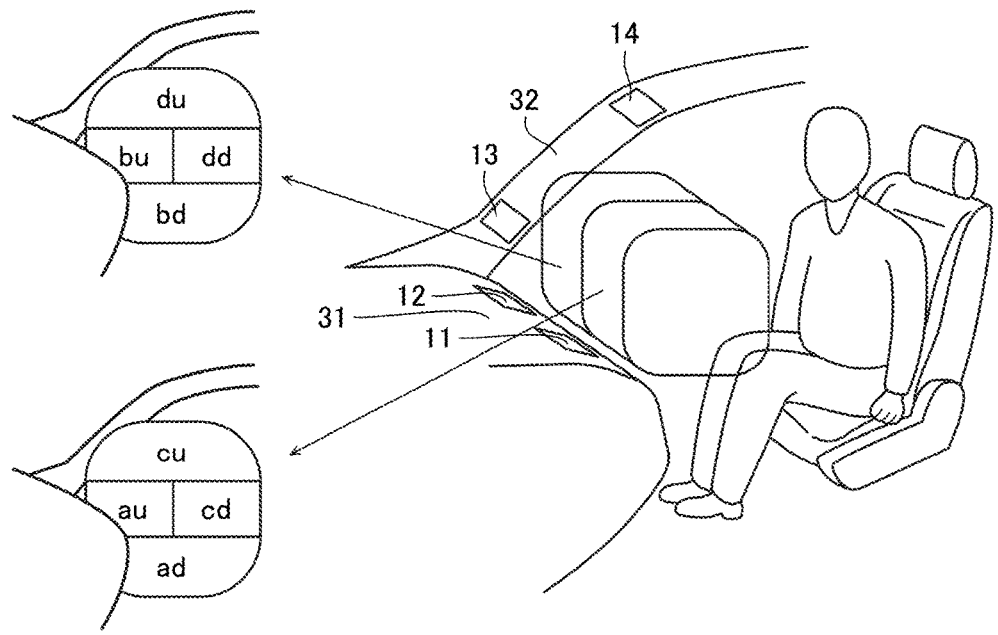
FIG. 10 is a schematic view for explaining the same method.

Division of the areas is performed considering a variety of factors such as disposition or detection range of the sensor electrodes, and so on. In the present embodiment, as shown in FIG. 9, in the region where occupant detection is performed by the sensor electrodes 11 to 14, a forward left region is called area a, a forward right region is called area b, a rearward left region is called area c, and a rearward right region is called area d. Moreover, as shown in FIG. 10, the above-described four areas a, b, c, and d may each also have their area further divided in a height direction. In this case, for example, an upward portion of area a is called area au, a downward portion of area a is called area ad, an upward portion of area b is called area bu, a downward portion of area b is called area bd, an upward portion of area c is called area cu, a downward portion of area c is called area cd, an upward portion of area d is called area du, and a downward portion of area d is called area dd.

[Specification of Area]

Figure 7:
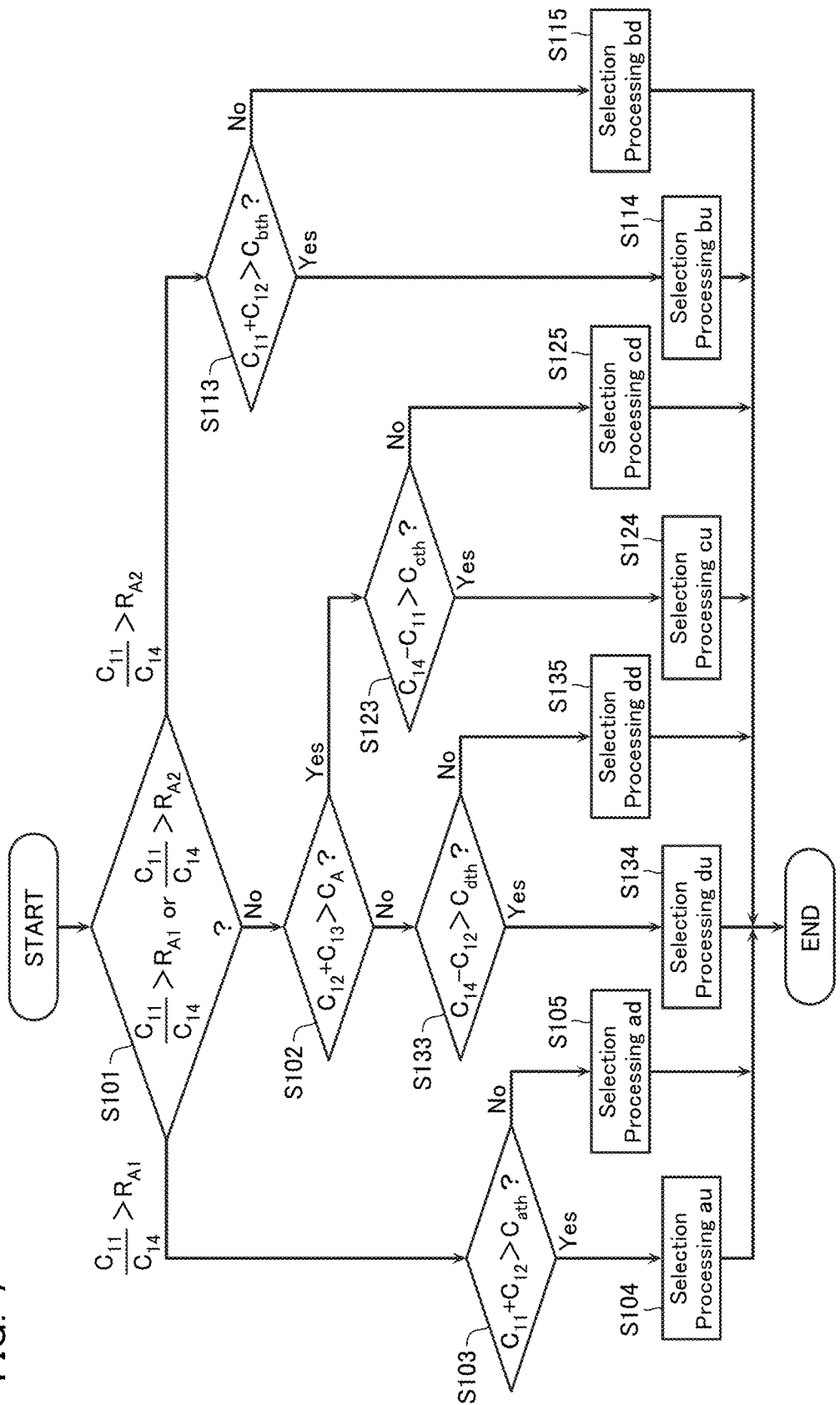
FIG. 7 is a flowchart for explaining a specification method of an area where an occupant is positioned, according to the same embodiment.

Next, a specification method by the computation unit 25, of the area where the occupant is positioned, will be described. FIG. 7 is a flowchart for explaining the specification method of the area where the occupant is positioned. In the present embodiment, a ratio of detection signals is employed to specify the head position of the occupant between the sensor electrodes, and a sum is employed to specify a distance from a sensor electrode group to the head position of the occupant. However, a variety of methods are applicable to specification of the area, and it is of course also possible to perform computation employing the likes of an absolute value of the detection signal, a difference between the detection signals, a product of the detection signals, or a combination thereof.

The computation unit 25 first determines in which of areas a to d the head of the occupant is positioned (steps S101 and S102).

Figure 8:
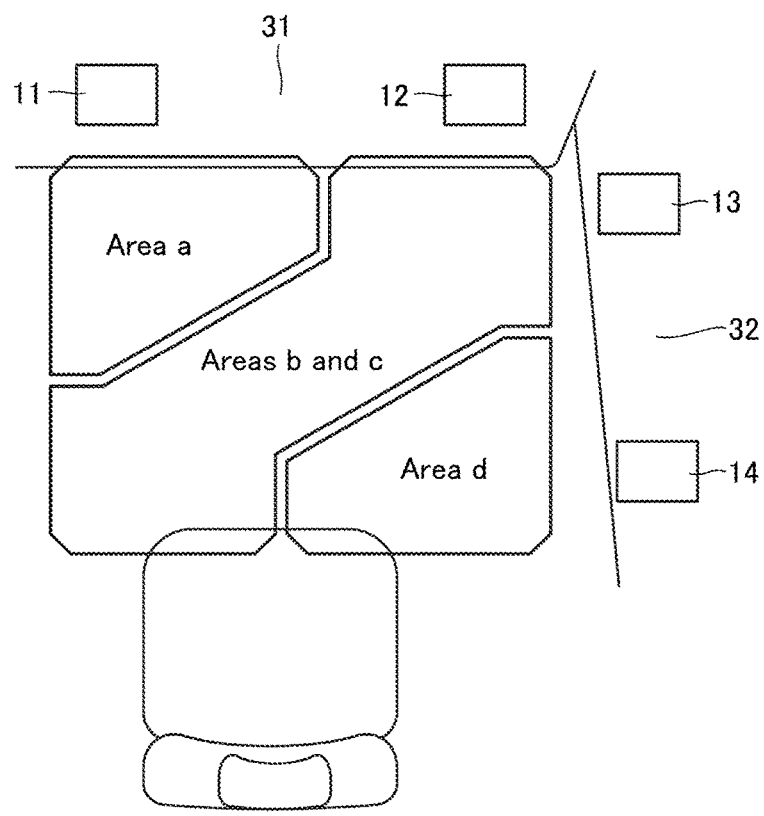
FIG. 8 is a schematic view for explaining the same method.

As shown in FIG. 8, the computation unit 25 determines that if the ratio C11/C14 between the detection signal C11 of the sensor electrode 11 disposed on the instrument panel 31 and the detection signal C14 of the sensor electrode 14 disposed on the pillar 32 is larger than a certain threshold value RA1, then the head of the occupant is positioned in area a, determines that if it is smaller than a threshold value RA2 (<RA1), then the head of the occupant is positioned in area d, and in the case that it is smaller than RA1 and larger than RA2, determines that the head of the occupant is positioned in area b or area c (step S101).

As shown in FIG. 9, in the case where it has been determined in step S101 that the head of the occupant is positioned in area b or area c, if a sum C12+C13 of the detection signal C12 of the sensor electrode 12 and the detection signal C13 of the sensor electrode 13 is larger than a pre-set threshold value CA, then it is determined that the head of the occupant is in area b, and if smaller, then it is determined that the head of the occupant is in area c (step S102).

Next, as shown in FIG. 10, the computation unit 25 determines whether the head of the occupant is positioned upwardly or is positioned downwardly (steps S103, S113, S123, and S133).

In the case where it has been determined in step S101 that the head position of the occupant is positioned in area a or area b, the head position of the occupant is close to the instrument panel 31, hence a distance from the instrument panel 31 is detected. That is, if a sum C11+C12 of the detection signal C11 of the sensor electrode 11 disposed on the instrument panel 31 and the detection signal C12 of the sensor electrode disposed on the instrument panel 31 is larger than threshold values Cath or Cbth, then it is determined that the head of the occupant is positioned in area au or area bu, and if smaller, then it is determined that the head of the occupant is positioned in area ad or area bd (steps S103 and S113).

In the case where it has been determined in step S102 that the head of the occupant is positioned in area c, a height of the head position of the occupant is detected by combining the detection signals of sensor electrodes disposed with a distance provided in the height direction. For example, if a difference C14−C11 between the detection signal C14 of the sensor electrode 14 and the detection signal C11 of the sensor electrode 11 is larger than a threshold value Ccth, then it is determined that the head of the occupant is positioned in area cu, and if smaller, then it is determined that the head of the occupant is positioned in area cd (step S123).

Also in the case where it has been determined in step S102 that the head of the occupant is positioned in area d, the height of the head position of the occupant is detected by a method similar to that in step S123. For example, if a difference C14-C12 between the detection signal C14 of the sensor electrode 14 and the detection signal C12 of the sensor electrode 12 is larger than a threshold value Cdth, then it is determined that the head of the occupant is positioned in area du, and if smaller, then it is determined that the head of the occupant is positioned in area dd (step S133).

[Setting of Computation Conditions]

Next, conditions for computation of the occupant position are set according to the region determined to be where the head of the occupant is positioned, of areas au to du and ad to dd (steps S104, S105, S114, S115, S124, S125, S134, and S135). The conditions of computation may include the likes of selection of the detection signal suitable for computation of the occupant position or weighting (sensor sensitivity) of the detection signal, a calculation formula, an algorithm, and so on. In the present embodiment, a combination and weighting (sensor sensitivity) of the detection signals used in computation of the occupant position (step S200) are set as the conditions for computation. One example of set conditions is shown in FIG. 11. In the present embodiment, the detection signal used is determined according to which of areas a to d the head position of the occupant is positioned in, and weighting (sensor sensitivity) of the detection signal is adjusted according to height information. However, weighting is not essential.

The detection signal used in computation is selected considering a variety of factors such as disposition or detection range of the sensor electrode, and so on. However, in this embodiment, at least the detection signal outputted from the detector closest to the area where the occupant is positioned is used in computation.

If the area where the occupant is positioned is close to a specific sensor electrode, it is conceivable to secure sensitivity of the detection signal by combining the detection signal outputted from the detector closest to the area where the occupant is positioned and another detection signal. For example, in the present embodiment, as shown in FIG. 11, in the case where it has been determined that the head position of the occupant is positioned in area a (area au or ad), combinations of the sensor electrode 11 (detection signal C11) and the sensor electrode 12 (detection signal C12), the sensor electrode 11 (detection signal C11) and the sensor electrode 13 (detection signal C13), and the sensor electrode 11 (detection signal C11) and the sensor electrode 14 (detection signal C14), are selected. However, in the case where the head position of the occupant has approached excessively too close to the sensor electrode, a different combination of the sensor electrodes may be selected to prevent an incorrect operation due to saturation. For example, in the present embodiment, in the case where it has been determined that the head of the occupant is positioned in area d (area du or dd), it is possible to configure to select combinations of the sensor electrode 11 (detection signal C11) and the sensor electrode 13 (detection signal C13), the sensor electrode 11 (detection signal C11) and the sensor electrode 14 (detection signal C14), and the sensor electrode 13 (detection signal C13) and the sensor electrode 14 (detection signal C14). However, considering there is a risk that the head of the occupant approaches too close to the sensor electrode 13 and the sensor electrode 14, a combination of the sensor electrode 12 (detection signal C12) and the sensor electrode 14 (detection signal C14) is selected instead of the sensor electrode 13 (detection signal C13) and the sensor electrode 14 (detection signal C14).

Moreover, if the area where the occupant is positioned is not close to a specific sensor electrode, then, in order to detect the head position of the occupant in the traveling direction, left-right extending width direction, and height direction of the vehicle, it is conceivable to select a combination of the sensor electrodes provided having a certain distance in each of the directions. For example, in the present embodiment, in the case where it has been determined that the head of the occupant is positioned in area b, the combinations of the sensor electrode 11 (detection signal C11) and the sensor electrode 14 (detection signal C14), and the sensor electrode 12 (detection signal C12) and the sensor electrode 14 (detection signal C14) are selected for suitably detecting the head position of the occupant in the traveling direction and height direction of the vehicle, and the combination of the sensor electrode 11 (detection signal C11) and the sensor electrode 13 (detection signal C13) is selected for suitably selecting the head position of the occupant in the width direction. A substantially similar selection is performed also in the case where it has been determined that the head of the occupant is positioned in area c, but the combination of the sensor electrode 11 (detection signal C11) and the sensor electrode 12 (detection signal C12) is selected to detect the width direction. This is because area c is closer to the sensor electrode 12 than to the sensor electrode 13.

[Computation of Occupant Position]

Figure 12:
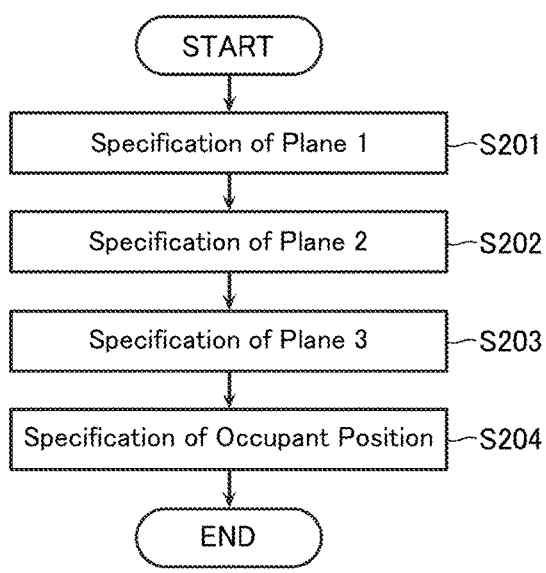
FIG. 12 is a flowchart for explaining the same method.

Next, the computation unit 25 compute the head position of the occupant using the conditions set in steps S104, S105, S114, S115, S124, S125, S134, or S135 (refer to FIG. 11). FIG. 12 is a flowchart for explaining a computation method of the occupant position according to the present embodiment. Moreover, FIGS. 13 to 16 are plan views for explaining the same computation method and respectively show the cases where it has been determined that the head of the occupant is positioned in areas a to d.

In the present embodiment, the computation unit 25 first calculates three types of ratios of combinations of electrostatic capacitance of designated sensor electrodes, calculates positions of planes 1 to 3 specified by each of the ratios of electrostatic capacitance (steps S201 to S203), and calculates as the head position of the occupant the intersection point where the calculated planes 1 to 3 intersect (step S204). Note that the processing due to step S204 can be performed similarly to that of the above-described step S4 of FIG. 2.

Figure 13:
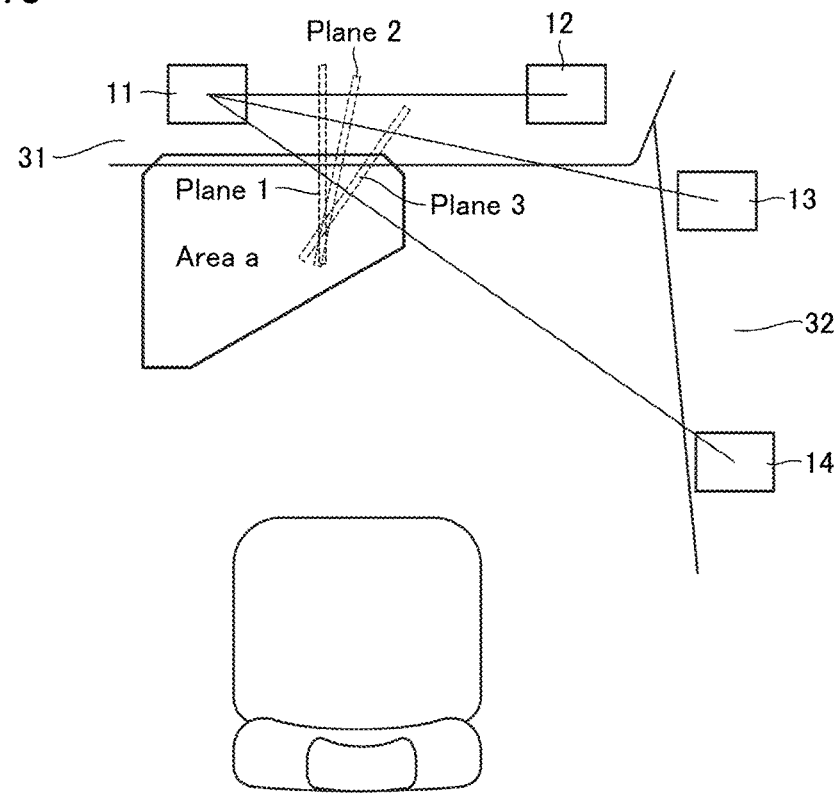
FIG. 13 is a schematic view for explaining the same method.
Figure 14:
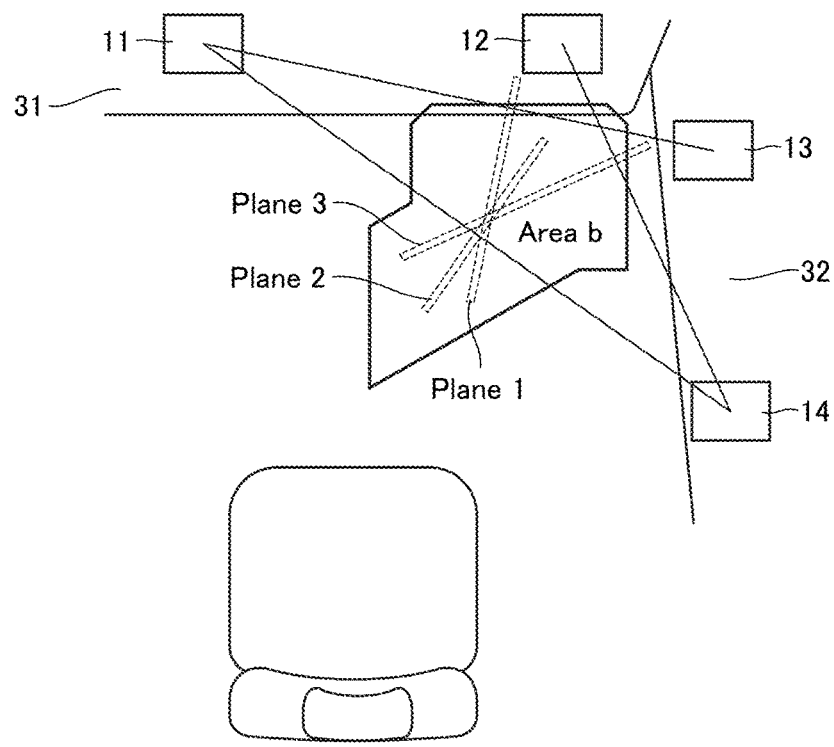
FIG. 14 is a schematic view for explaining the same method.
Figure 15:
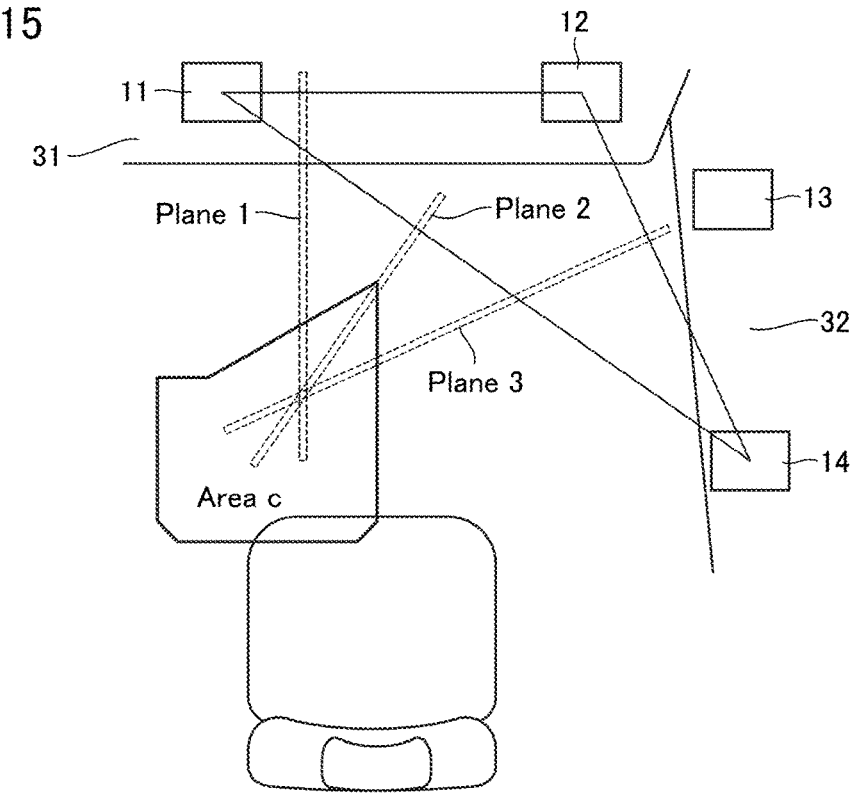
FIG. 15 is a schematic view for explaining the same method.
Figure 16:
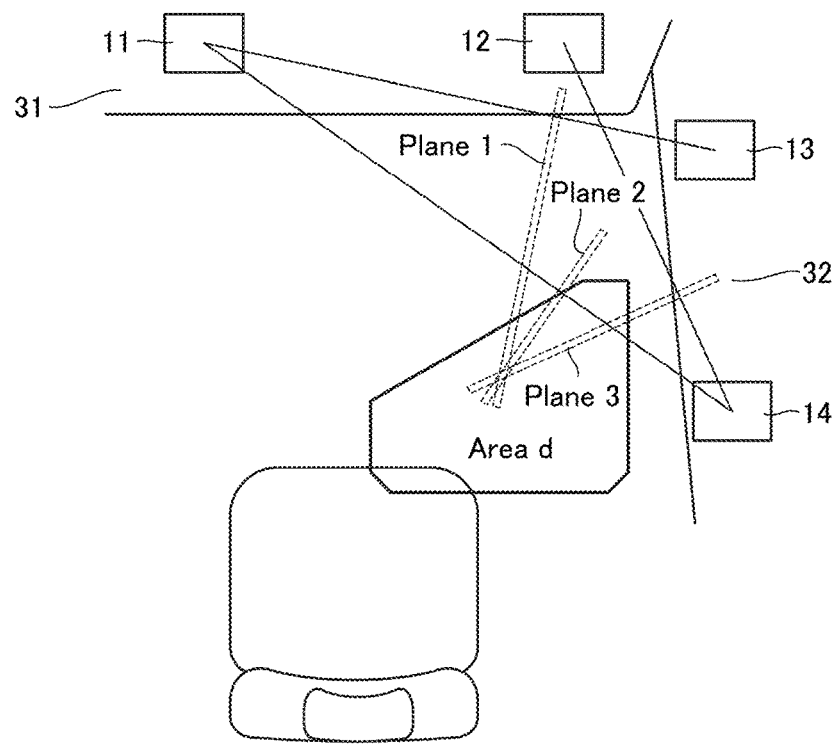
FIG. 16 is a schematic view for explaining the same method.

For example, in the case where it has been determined that the head position of the occupant is positioned in area a, first, as shown in FIG. 13, a ratio $\alpha1=C11/C12$ of electrostatic capacitance between the sensor electrode 11 disposed on the left side of the instrument panel 31 and the sensor electrode 12 disposed on the right side of the instrument panel 31, is calculated, and a plane 1 which is a set of points where $\alpha1$ holds, is specified (step S201). Next, the computation unit 25 calculates a ratio $\alpha2=C11/C13$ of electrostatic capacitance between the sensor electrode 11 disposed on the left side of the instrument panel 31 and the sensor electrode 13 disposed in the lower portion of the pillar 32, and specifies a plane 2 which is a set of points where $\alpha2$ holds (step S202). Next, the computation unit 25 calculates a ratio $\alpha3=C11/C14$ of electrostatic capacitance between the sensor electrode 11 disposed on the left side of the instrument panel and the sensor electrode 14 disposed in the upper portion of the pillar, and specifies a plane 3 which is a set of points where $\alpha3$ holds (step S203). In steps S201 to S203, if the head of the occupant approaches the sensor electrodes of a numerator side of $\alpha1$ to $\alpha3$ (C11, C11, and C11), then $\alpha1$ to $\alpha3$ become respectively larger, and if the head of the occupant approaches the sensor electrodes of a denominator side of $\alpha1$ to $\alpha3$ (C12, C13, and C14), then $\alpha1$ to $\alpha3$ become respectively smaller, hence a position of plane 1 to plane 3 can be inferred from a value of $\alpha1$ to $\alpha3$.

Fourth Embodiment

Next, an occupant position detection device according to a fourth embodiment of the present invention will be described. The occupant position detection device according to the present invention is configured substantially similarly to the occupant position detection device according to the third embodiment. However, in the present embodiment, the occupant position is computed and outputted by a method below.

[Conventional Problem]

A problem in the conventional technology and operation of the occupant position detection device according to the present embodiment will be described. As shown in, for example, FIG. 17, in a case such as where the occupant is holding their hand close to the sensor electrode 12 in the passenger seat of the vehicle, the sensor electrode 12 and the hand of the occupant sometimes end up approaching each other exceeding a detectable range of the sensor electrode 12. When the sensor electrode 12 and the hand of the occupant are closer than a certain distance in this way, electrostatic capacitance detected by the sensor electrode 12 increases exceeding a detectable value of the sensor electrode 12, and the detection signal outputted from the sensor electrode ends up being saturated. The detection signal saturated in this way is not capable of suitably detecting the position of the occupant and there is a possibility that it will cause an incorrect operation if used in computation of the occupant position.

[Outline of Operation]

Figure 18:
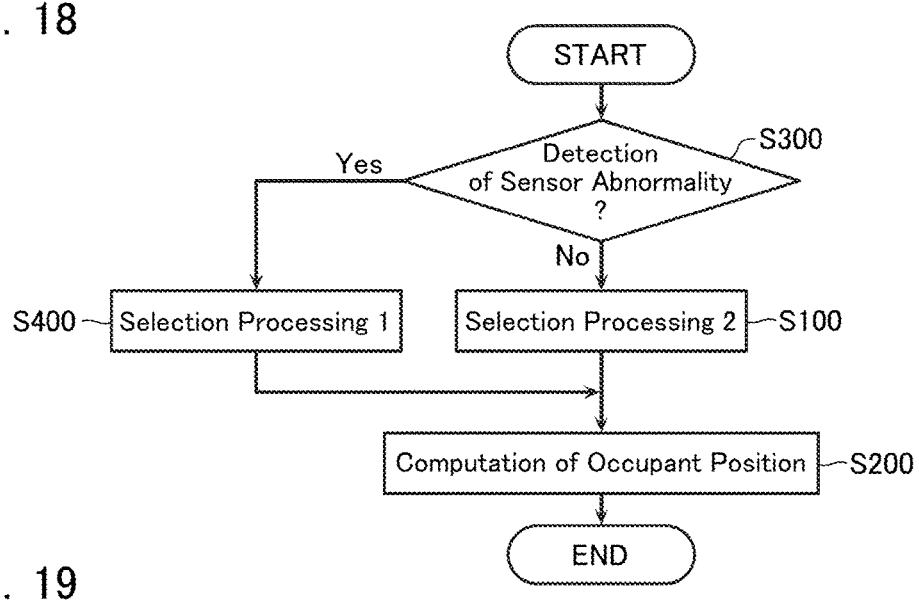
FIG. 18 is a flowchart for explaining an occupant position detection method according to a fourth embodiment of the present invention.

FIG. 18 is a flowchart for explaining operation of the occupant position detection device according to the present embodiment. The computation unit 25 performs a sensor abnormality detection determination to determine whether the detection signals outputted from the sensor electrodes 11 to 14 satisfy a certain condition (step S300). In the present embodiment, if an output value of the detection signal is within a certain output range, then it is determined that the certain condition is satisfied, and if outside the certain output range, then it is determined that the certain condition is not satisfied. In the case that any of the detection signals outputted from the sensor electrodes 11 to 14 was outside the certain range, a first selection processing is performed, that detection signal is determined to be abnormal, and detection signals within the certain output range are selected as the signals for using in computation of the occupant position (step S400). In the case that all of the detection signals outputted from the sensor electrodes 11 to 14 were within the certain range, a second selection processing is performed, the region for detecting the position of the occupant is divided into a plurality of areas, the area where the occupant is positioned is specified based on the detection signal, and the detection signal for using in computation of the occupant position is selected based on the specified area (step S100). Subsequently, the occupant position is computed based on the selected detection signal, and is outputted (step S200).

[Sensor Abnormality Detection Determination]

Figure 19:
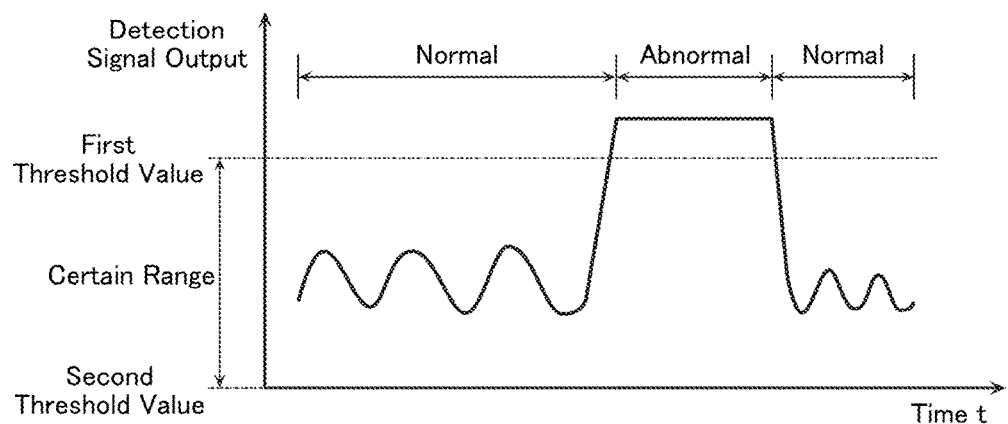
FIG. 19 is a waveform chart for explaining the same method.

In step S300, the occupant position detection device according to the present embodiment determines whether the detection signals outputted from the sensor electrodes 11 to 14 are within a certain range, or not. A variety of methods are applicable for specifying the certain range, but in the present embodiment, as shown in FIG. 19, a first and second threshold value are set as an upper limit and lower limit of the certain range. The first threshold value is conceivably set to a value which is less than or equal to an output value of a saturated detection signal, may be set to be substantially equal to a value of the saturated detection signal, and may also be set considering precision of the sensor electrodes 11 to 14. Moreover, the second threshold value may be set based on the likes of a range of detectable distance of the sensor electrodes 11 to 14 and may also be set considering precision of the sensor electrodes 11 to 14, and in certain cases need not particularly be provided. Moreover, in the present embodiment, the output value of the detection signal and the threshold value are compared to determine whether the sensor electrodes 11 to 14 are abnormal or are normal, but it is possible to perform the sensor abnormality detection determination by comparing with the threshold value a variety of values based on the detection signal such as an amount of increase per time of an electrostatic capacitance value, or a sum, difference, product, quotient, or combination thereof, of the detection values, and so on.

[First Selection Processing]

Figure 17:
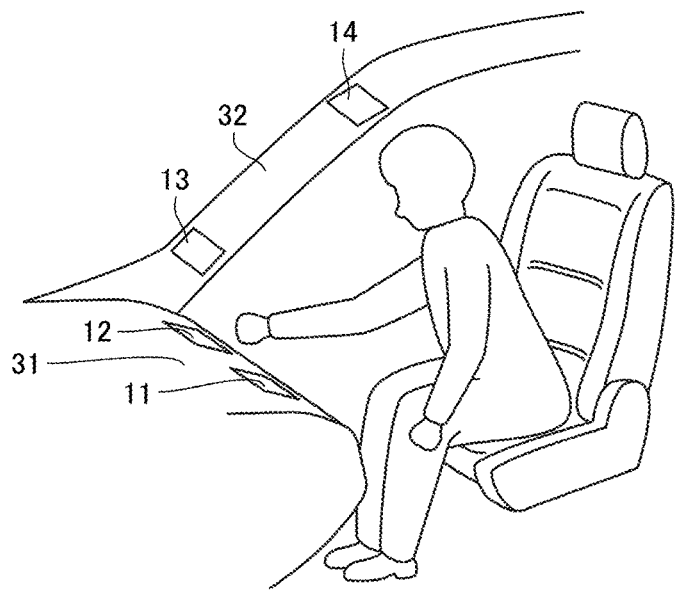
FIG. 17 is a schematic view for showing a problem in conventional technology.

Next, the first selection processing (step S400) will be described. In the first selection processing, the detection signals determined to be within the certain range in step S300 are selected as the detection signals to be used in computation of the occupant position in step S400. For example, in the case where the sensor electrode 12 is determined to be abnormal due to the right hand of the occupant being close to the sensor electrode 12 as shown in FIG. 17, the detection signals outputted from the sensor electrodes 11, 13, and 14 are selected.

[Computation of Occupant Position]

Figure 20:
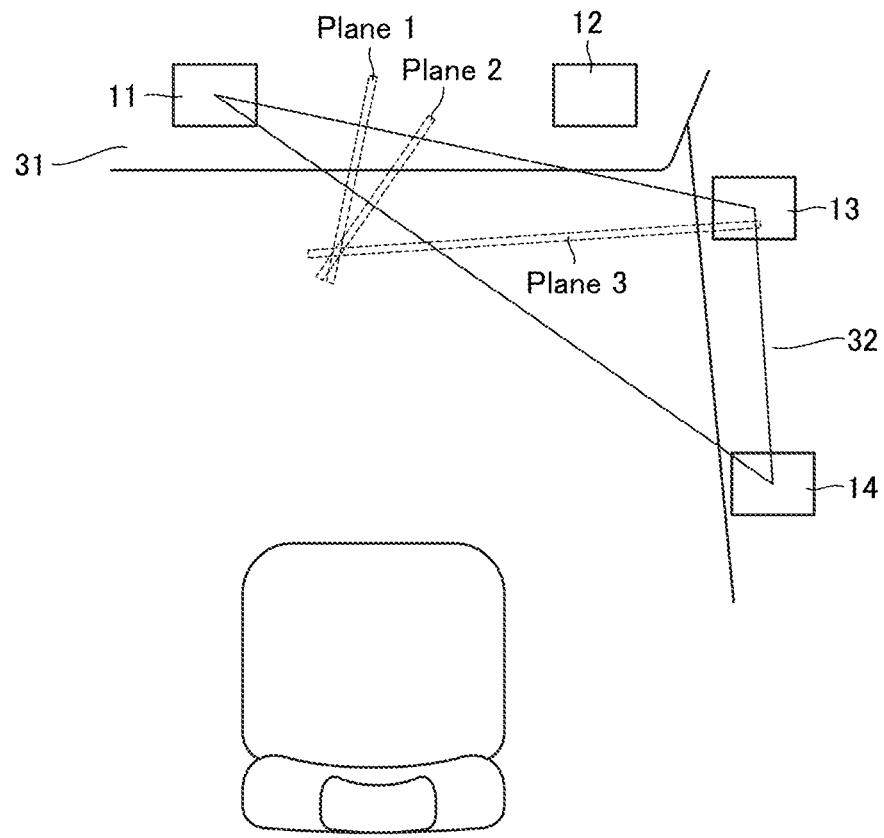
FIG. 20 is a schematic view for explaining the same method.

Next, a computation method of the occupant position in the present embodiment (step S200) will be described. FIG. 20 is a plan view for explaining the computation method of the occupant position in the present embodiment. The computation method of the occupant position in the present embodiment is basically similar to that of the first embodiment, but differs in the points below.

For example, in the case where it has been determined in step S300 that the detection signal outputted from the sensor electrode 12 is abnormal, the detection signals outputted from the sensor electrodes 11, 13, and 14 are selected as the detection signals used in computation of the occupant position. In such a case, first, as shown in FIG. 20, a ratio $\alpha 1 = C11/C13$ of electrostatic capacitance between the sensor electrode disposed on the left side of the instrument panel 31 and the sensor electrode 13 disposed in the lower portion of the pillar 32, is calculated, and a plane 1 which is a set of points where $\alpha 1$ holds, is specified (step S201). Next, the computation unit 25 calculates a ratio $\alpha 2 = C11/C14$ of electrostatic capacitance between the sensor electrode 11 disposed on the left side of the instrument panel 31 and the sensor electrode disposed in the upper portion of the pillar 32, and specifies a plane 2 which is a set of points where $\alpha 2$ holds (step S202). Next, the computation unit 25 calculates a ratio $\alpha 3 = C13/C14$ of electrostatic capacitance between the sensor electrode 13 disposed in the lower portion of the pillar and the sensor electrode 14 disposed in the upper portion of the pillar, and specifies a plane 3 which is a set of points where $\alpha 3$ holds (step S203). In steps S201 to S203, if the head of the occupant approaches the sensor electrodes of a numerator side of $\alpha 1$ to $\alpha 3$ (C11, C11, and C13), then $\alpha 1$ to $\alpha 3$ become respectively larger, and if the head of the occupant approaches the sensor electrodes of a denominator side of $\alpha 1$ to $\alpha 3$ (C13, C14, and C14), then $\alpha 1$ to $\alpha 3$ become respectively smaller, hence a position of plane 1 to plane 3 can be inferred from a value of $\alpha 1$ to $\alpha 3$.

In the case where it has been determined in step S300 that all of the sensor electrodes are normal, it is possible to perform a calculation method similar to that of the third embodiment employing the detection signal selected in step S100 (refer to FIGS. 13 to 16). Moreover, in the case where it has been determined that any of the sensor electrodes 11, 13, and 14 is abnormal, it is possible to calculate $\alpha 1$ to $\alpha 3$ employing the detection signals outputted from the three sensor electrodes determined to be not abnormal, and detect the head position of the occupant. Furthermore, in the case where it has been determined in step S300 that two of the sensor electrodes are abnormal, the position of the occupant head is specified employing the detection signals outputted from the two sensor electrodes determined to be normal. For example, in the case where it has been determined that the sensor electrodes 13 and 14 installed in the pillar 32 are abnormal, it is possible to specify a width direction position of the occupant from a ratio C11/C12 of the detection signal outputted from the sensor electrode 11 and the detection signal outputted from the sensor electrode 12. Furthermore, it is possible to specify a position in the forward-rearward direction of the occupant by a sum C11+C12 of the detection signals.

Note that in the present embodiment, in the case where it has been determined that any one of the sensor electrodes C11 to C14 is abnormal, division of area is not performed, but this is due to the fact that in the present embodiment, four sensor electrodes are provided and in principle three detection signals are required in the calculation method in step S200. Therefore, in the case where the detection signals used in computation are not uniquely determined even when the detection signals outputted from abnormal sensor electrodes have been eliminated, such as in the case where there are five or more sensor electrodes or in the case where a different computation method is employed by step S200 and only one or two sensor electrodes are used, it is possible for division of area to be performed after an abnormal sensor electrode has been detected.

Fifth Embodiment

Figure 21:
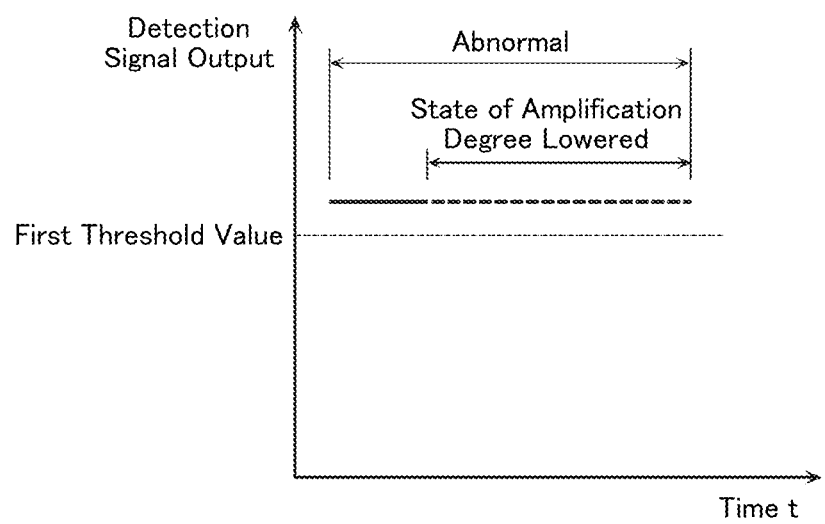
FIG. 21 is a schematic view for explaining an occupant position detection method according to a fifth embodiment of the present invention.
Figure 22:
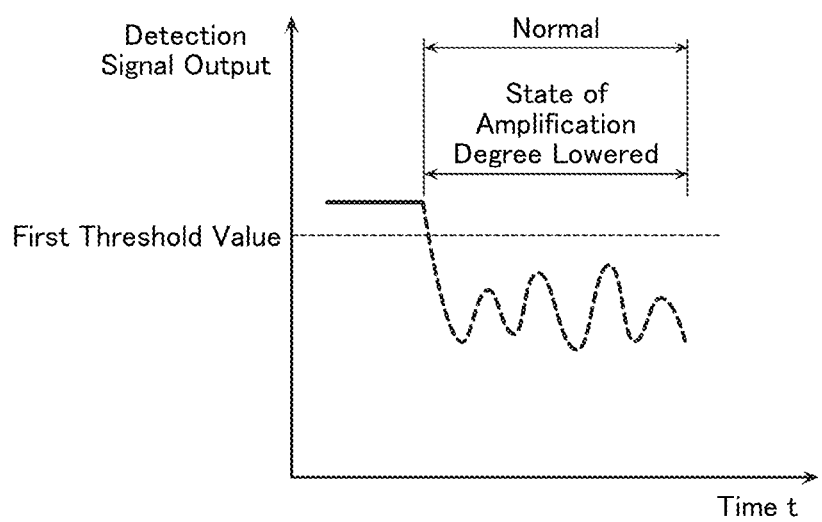
FIG. 22 is a schematic view for explaining the same method.

Next, an occupant position detection device and an airbag deployment control system for a vehicle, according to the fifth embodiment of the present invention, will be described. The occupant position detection device and airbag deployment control device according to the present embodiment are basically similar to those of the fourth embodiment. However, in the present embodiment, the amplification degree or sensitivity of the sensor determined to be abnormal is controlled, and in the case where output of the detection signal outputted after control is within the certain output range, the sensor is determined to be normal. For example, when the amplified detection signal by the sensor electrode 11 is greater than or equal to the first threshold value, the amplification degree of the detection signal by the sensor electrode 11 is reduced. As shown in FIG. 21, in the case where the output value of the detection signal by the sensor electrode 11 is greater than or equal to the first threshold value even after reducing the amplification degree of the detection signal by the sensor electrode 11, the sensor electrode 11 is determined to be abnormal, and the detection signals by the sensor electrodes 12 to 14 are used in computation. On the other hand, as shown in FIG. 22, if, as a result of reducing the amplification degree of the detection signal by the sensor electrode 11, the output value of the detection signal by the sensor 11 has become less than or equal to the first threshold value, then the detection signal by the sensor 11 also becomes a candidate for the detection signal used in computation. Note that during calculation of planes 1 to 3 in steps S201 to S203, values of α1 to α3 need to be adjusted according to the amplification degree of the sensor. That is, in the case where the detection signal of the sensor on a numerator side is C1 and the detection signal of the sensor on a denominator side is C2, and the amplification degree of the sensor on the numerator side is 1/k1 times and the amplification degree of the sensor on the denominator side is 1/k2 times, then $\alpha=(k2C1)/(k1C2)$.

Sixth Embodiment

Next, an occupant position detection device and an airbag deployment control system for a vehicle, according to the sixth embodiment of the present invention, will be described in detail.

[1. Overall Configuration]

Figure 23:
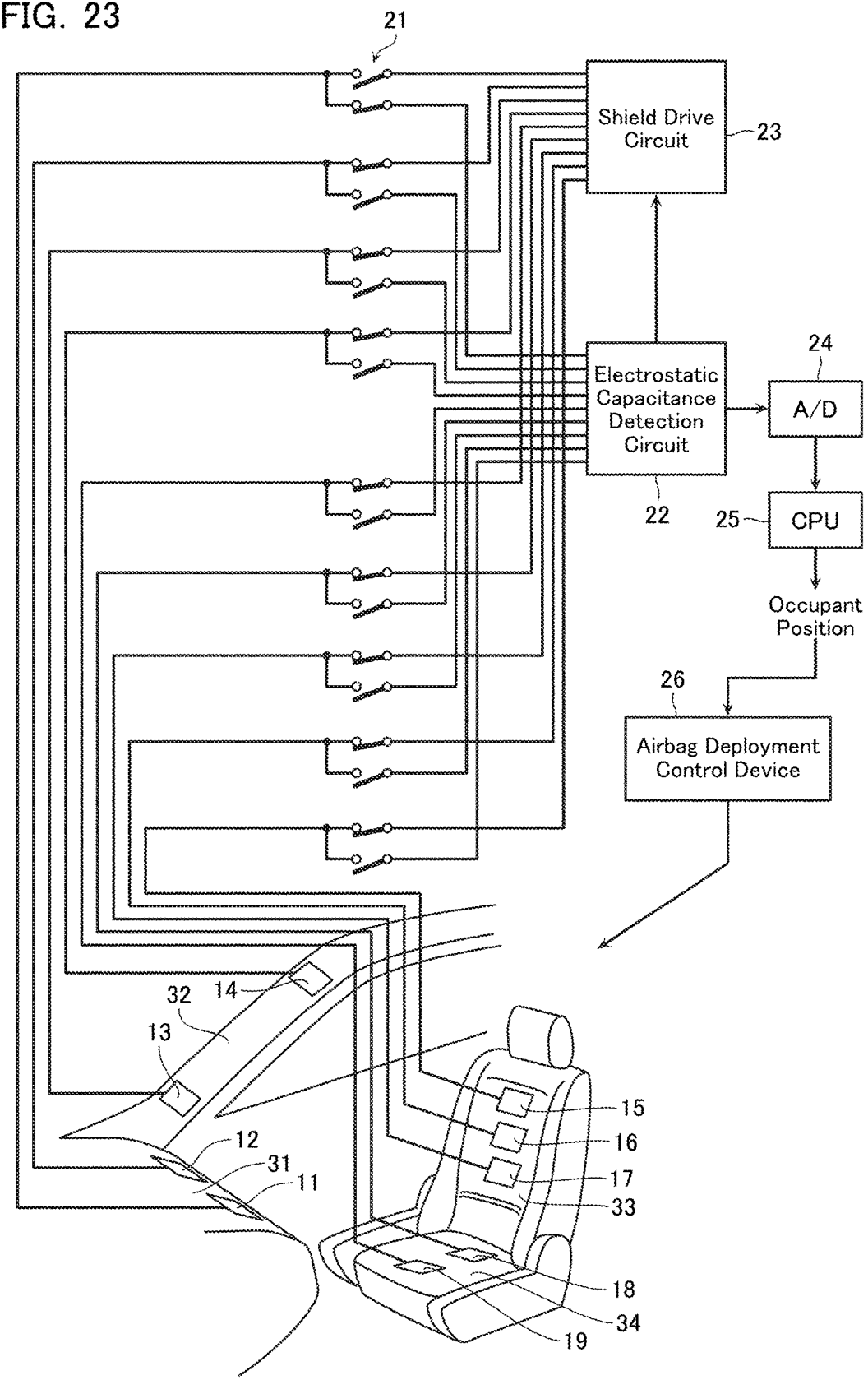
FIG. 23 is a block diagram showing a configuration of an occupant position detection device and an airbag deployment control system according to a sixth embodiment of the present invention.

FIG. 23 is a view showing a configuration of the occupant position detection device and airbag deployment control system according to the present embodiment. The occupant position detection device according to the present embodiment comprises: a sensor electrode 11 disposed on the left side (orientation from a viewpoint of the occupant, same hereafter) of an instrument panel 31 forward of a driving seat or a passenger seat, and acting as a first detector; a sensor electrode 12 disposed on the right side of the instrument panel 31 and acting as a first detector; a sensor electrode 13 installed in a lower portion of a pillar 32 diagonally forward of the driving seat or the passenger seat, and acting as a first detector; and a sensor electrode 14 installed in an upper portion of the pillar 32 and acting as a first detector. Moreover, the occupant position detection device according to the present embodiment comprises a sensor electrode 15 in an upper portion, a sensor electrode 16 in a middle portion, and a sensor electrode 17 in a lower portion of a seatback surface 33 that act as a second detector, and comprises a sensor electrode 18 rearward and a sensor electrode 19 forward in a seat seating surface 34 that act as a second detector. The sensor electrodes 11 to 19 are electrostatic capacitance type sensor electrodes. The sensor electrodes 11 to 14 configuring the first detector detect a change in electrostatic capacitance between a position of an occupant and the sensor electrodes 11 to 14, and output the change as a first detection signal. Moreover, the sensor electrodes 15 to 19 configuring the second detector detect a change in electrostatic capacitance between a back portion and buttocks of the occupant and the sensor electrodes 15 to 19, and output the change as a second detection signal. Note that the first detector in the present embodiment is the same as the detector in the first through fifth embodiments, but in the present embodiment is called the first detector for distinction from the second detector.

The sensor electrodes 11 to 19 are connected and inputted to an electrostatic capacitance detection circuit 22 and a shield drive circuit 23 via switches 21. The switches 21 connect one of the sensor electrodes 11 to 19 to the electrostatic capacitance detection circuit 22, and the remaining eight of the sensor electrodes 11 to 19 to the shield drive circuit 23. Note that the switches 21 may be controlled by a CPU, and may also be switched according to a clock of the electrostatic capacitance detection circuit 22. The shield drive circuit 23 prevents a capacitance from being generated between the sensor electrode in the middle of capacitance detection and the other eight of the sensor electrodes by setting a potential of the eight sensor electrodes connected to the shield drive circuit 23 to the same potential as a potential of the sensor electrode connected to the electrostatic capacitance detection circuit 22. The above-described configuration results in the detection signals outputted from the sensor electrodes 11 to being processed by time division by one electrostatic capacitance detection circuit 22.

An A/D conversion circuit 24 converts the first and second detection signals detected by the electrostatic capacitance detection circuit 22 to digital information, and inputs the converted first and second detection signals to a computation unit 25 (CPU). The computation unit 25 is inputted with the first and second detection signals converted to digital information, to compute the position and posture of the occupant by a later-mentioned method, and outputs these position and posture of the occupant.

The occupant position outputted from the computation unit 25 is inputted to an airbag deployment control device 26. The airbag deployment control device 26 performs deployment control of an airbag not illustrated housed in the likes of the instrument panel 31, a steering center, a pillar, a door, and so on, not illustrated, based on an occupant position outputted from the computation unit 25 and an output of the likes of an acceleration sensor not illustrated. For example, it is possible for deployment of the airbag to not be performed when a distance between a head position of the occupant and the airbag is within a certain range and for deployment of the airbag to be performed when the distance between the head position of the occupant and the airbag is outside of the certain range, and it is also possible to control a position of the deploying airbag or a momentum when the airbag deploys, based on the head position of the occupant.

[2. Detection Signal]

As mentioned above, the sensor electrodes 11 to 19 according to the present embodiment are electrostatic capacitance type sensor electrodes, and output electrostatic capacitance as the detection signal. Below, electrostatic capacitances detected by the sensor electrodes 11 to 19 are respectively called C11 to C19. In the present embodiment, an absolute value of the electrostatic capacitances C11 to C19 is employed as the detection signal, but it is also possible to perform computation processing adopting as the detection signal a differential between electrostatic capacitances C11' to C19' when the occupant is not or when the occupant is assumed to be not within an occupant position detectable range of the sensor electrodes 11 to 19, and the electrostatic capacitances C11 to C19 when the occupant is assumed to be within the occupant position detectable range of the sensor electrodes 11 to 19. Note that a variety of methods can be applied as an acquisition method of the electrostatic capacitances C11' to C19', such as acquiring when the occupant is not or when the occupant is assumed to be not within the occupant position detectable range of the sensor electrodes 11 to 19, measuring as a trigger a vehicle signal such as a signal when the occupant has opened a key from outside in conjunction with keyless entry or a signal when the door has opened, using a value at a time of shipment, and so on.

[3. Operation]

Figure 24:
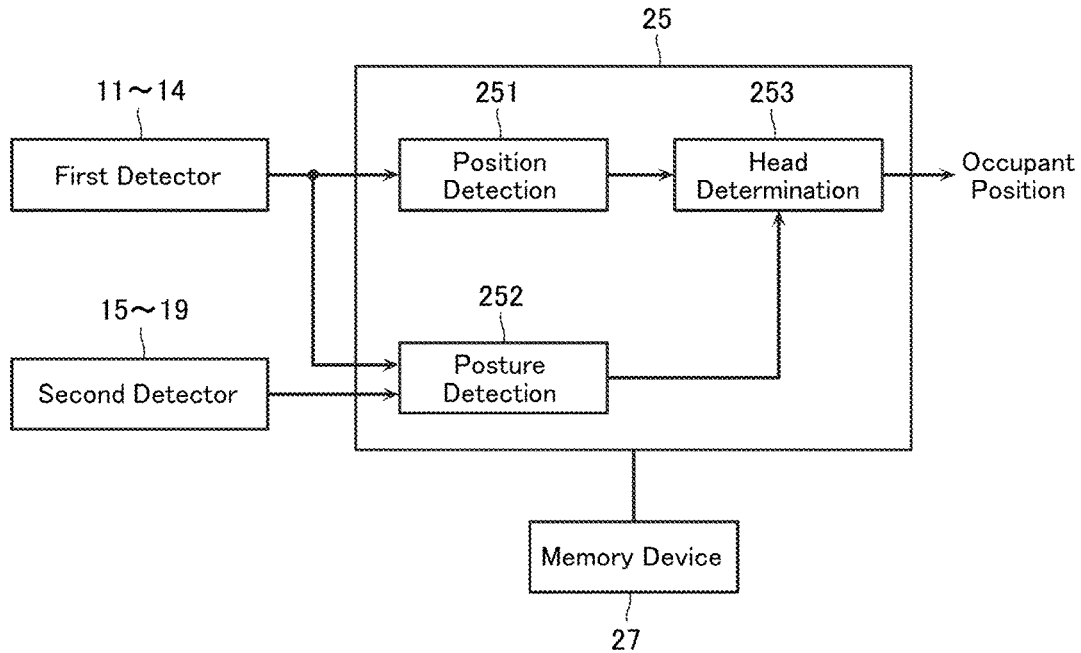
FIG. 24 is a block diagram showing a configuration of a computation unit according to the present embodiment.

Next, operation of the occupant position detection device according to the present embodiment will be described. FIG. 24 is a block diagram showing a configuration of the computation unit 25. In the present embodiment, the computation unit 25 achieves a function below, based on a program stored in a memory device 27. That is, a position detection unit 251 is inputted with the first detection signal outputted from the first detector (sensor electrodes 11 to 14) to detect the position of the occupant. Note that a detection method of the position of the occupant by the first detector can be performed by a method similar to the above-described methods according to the first through fifth embodiments. A posture detection unit 252 is inputted with the first detection signal and the second detection signal outputted from the second detector (sensor electrodes 15 to 19) to detect the posture of the occupant. A head determination unit 253 determines whether the position outputted from the position detection unit 251 is a position of a head of the occupant, based on the posture of the occupant outputted from the posture detection unit 252.

[3-1. Operation of Posture Detection Unit]

Next, operation of the posture detection unit 252 will be described in detail. As mentioned above, the posture detection unit 252 is inputted with the first and second detection signals to detect the posture of the occupant. Detection of the posture of the occupant is performed by, for example, determining from the detection signals outputted from the sensor electrodes 11 to 19 whether the occupant is extending their hand or not and whether the occupant is in a forward-inclining posture or not. Detection of the posture of the occupant can be achieved by a variety of methods such as pre-storing in the memory device 27 the likes of a pattern or condition of output of the first and second detection signals based on a posture of the occupant, and checking it against the first and second detector actually outputted.

Note that in the description below, a threshold value is set with respect to magnitude of the detection signal outputted from the sensor electrodes 11 to 19, and when the magnitude of the detection signal outputted from the sensor electrodes 11 to is greater than or equal to a first threshold value, an output value is determined to be in a "large" state, when less than or equal to a second threshold value smaller than the first threshold value, is determined to be in a "small" state, and when less than or equal to the first threshold value and greater than or equal to the second threshold value, is determined to be in a "medium" state. Note that the first threshold value and the second threshold value can be respectively set for the sensor electrodes 11 to 19, in view of the likes of their distance from the occupant or sensitivity, and so on.

[3-1-1. Determination of Forward-Inclining Posture]

First, an example of a determination method of whether the occupant is in a forward-inclining posture or not, will be described.

Figure 25:
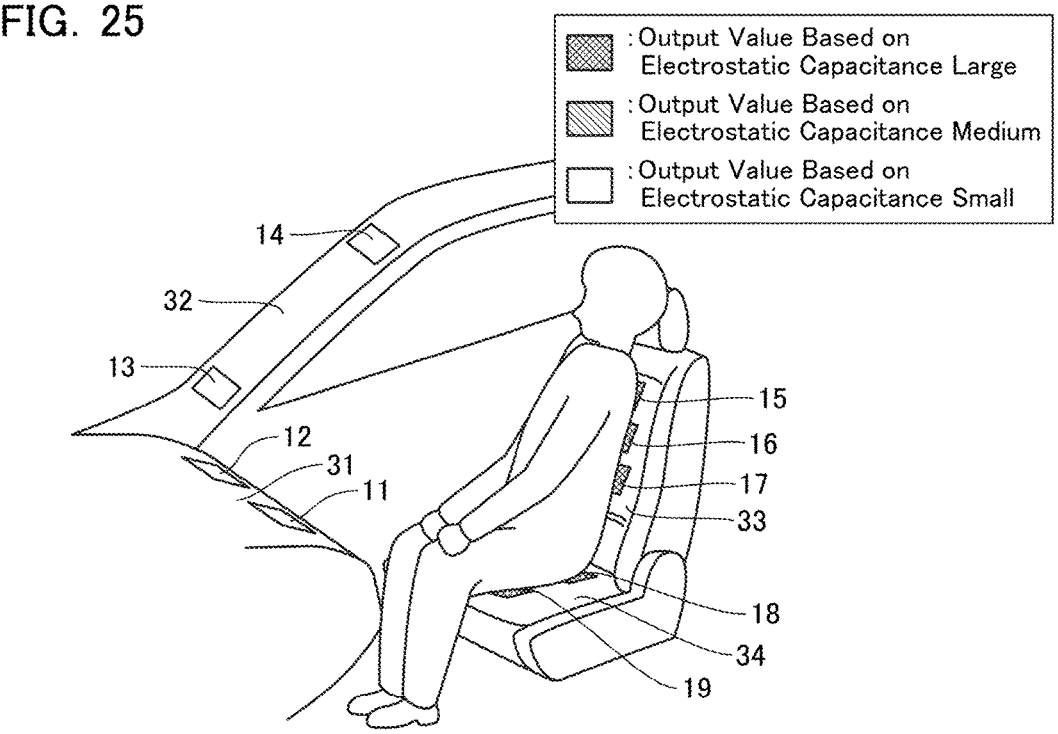
FIG. 25 is a perspective view for explaining a computation method of a posture of the occupant, according to the same embodiment.

FIG. 25 shows a situation when the posture of the occupant is a regular seated state (a state where the occupant is seated with their hands placed on their knees and their back against the seatback surface), and a tendency of the output value based on electrostatic capacitance detected by each of the sensor electrodes at that time. Now, it is only required that the sensor electrodes 15 to 19 detect contact to the seat or close proximity at a portion close to the seat by the back, buttocks, and legs of the occupant, hence sensitivity of the sensor electrodes 15 to 19 is set lower compared to that of the sensor electrodes 11 to 14. When the posture of the occupant is the regular seated state, the back portion of the occupant and the seatback surface 33 are in a state of being in contact, hence the output value of the detection signal detected from the sensor electrodes 15 to 17 installed in the seatback surface 33 attains the "large" state. On the other hand, the hands of the occupant are separated by a certain distance or more from the instrument panel 31 and the pillar 32, hence the output value of the detection signal outputted from the sensor electrodes 11 to 14 installed in the instrument panel 31 and the pillar 32 attains the "small" state.

Figure 26:
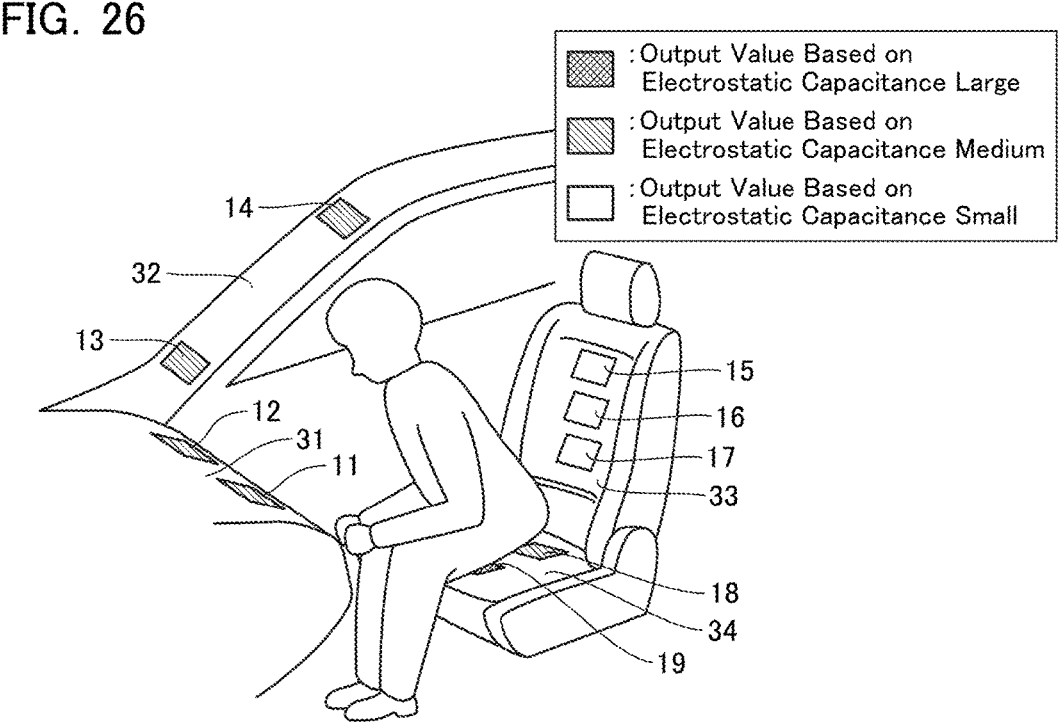
FIG. 26 is a perspective view for explaining the same method.

FIG. 26 shows a situation of a state where the posture of the occupant has changed from the regular seated state to the forward-inclining posture (referred to below as a forward-inclining seated state), and a tendency of the output value based on electrostatic capacitance detected by each of the sensor electrodes at that time. When the posture of the occupant is the forward-inclining seated state, the back portion of the occupant is separated by a certain distance or more from the seatback surface 33, hence the output value of the detection signal outputted from the sensor electrodes 15 to 17 installed in the seatback surface 33 attains the "medium" state or the "small" state. Moreover, a rear portion of the buttocks of the occupant rises up from the seat seating surface 34, hence the output value of the detection signal outputted from the sensor electrode 18 installed in a seat seating surface rearward portion attains the "medium" state, and the output value of the detection signal outputted from the sensor electrode 19 installed in a seat seating surface forward portion attains the "large" state. It is also conceivable that in a state where the occupant even further adopts the forward-inclining posture and a femoral region of the occupant has risen up from the seat seating surface 34, the "medium" state detection signal is detected from the sensor electrode 19 and the "small" state detection signal is detected from the sensor electrode 18. Moreover, the occupant head more closely approaches the sensor electrodes 11 to 14 compared to in the regular seated state, hence the "medium" state detection signal is outputted from the sensor electrodes 11 to 14.

Determination of the forward-inclining posture may be performed based on the detection signals outputted from the sensor electrodes 15 to 17 installed in the seatback surface 33, or may be performed based on the detection signals outputted from the sensor electrodes 18 and 19 installed in the seat seating surface 34. Moreover, it may of course also be performed based on the detection signals of all of the sensor electrodes 15 to 19 configuring the second detector.

[3-1-2. Determination of Position of Head of Occupant]

Next, in order to determine whether the occupant position outputted from the position detection unit 251 is the head position of the occupant or not, it is determined whether the occupant is extending their hand or not.

Figure 27:
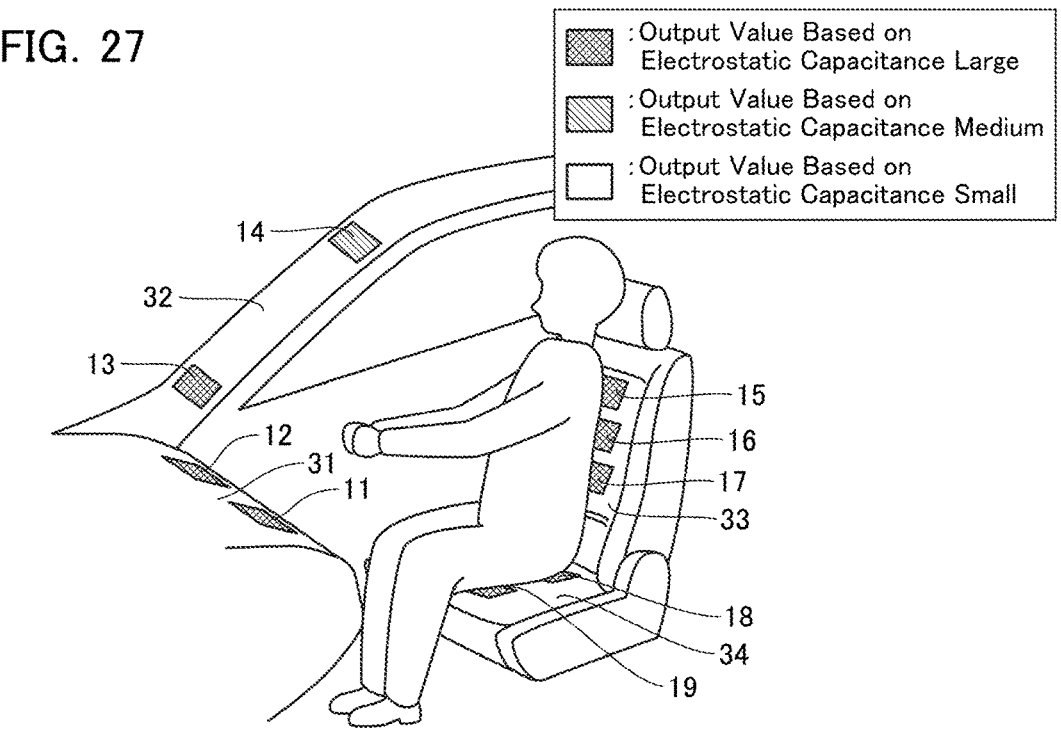
FIG. 27 is a perspective view for explaining the same method.

First, the case where it has been determined that the occupant is not in the forward-inclining posture, will be described. FIG. 27 shows a situation when the occupant has extended their hands in an instrument panel 31 direction from the regular seated state, and a tendency of the output value based on electrostatic capacitance detected by each of the sensor electrodes at that time. Contrary to the case shown in FIG. 25, when the occupant is extending their hands in the instrument panel 31 direction, the hands of the occupant and the instrument panel 31 contact or closely approach each other, hence the output value of the detection signal outputted from the sensor electrodes 11 and 12 installed in the instrument panel 31 attains the "large" state. Furthermore, the hands of the occupant and a pillar 32 lower portion come close to each other, hence the output value of the detection signal outputted from the sensor electrode installed in the pillar 32 lower portion attains the "large" state. On the other hand, a constant distance exists between the hands or head of the occupant and a pillar 32 upper portion, hence the output value of the detection signal outputted from the sensor electrode 14 installed in the pillar 32 upper portion attains the "medium" state.

Figure 28:
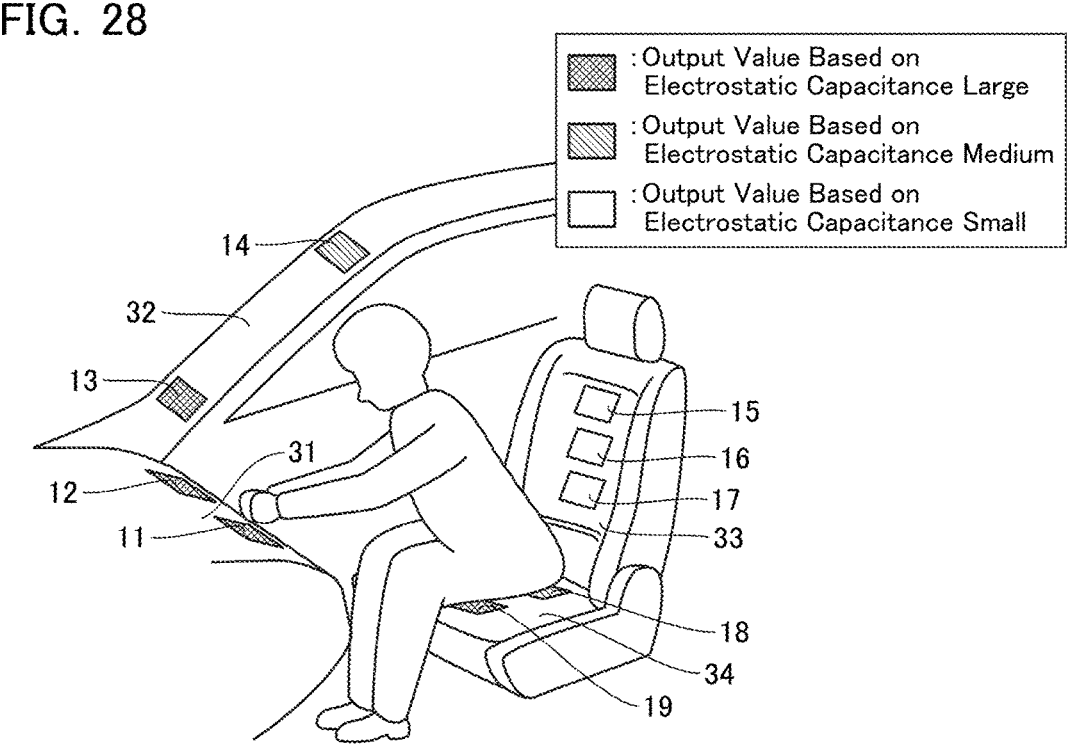
FIG. 28 is a perspective view for explaining the same method.

Next, the case where it has been determined that the occupant is in the forward-inclining posture, will be described. FIG. 28 shows a situation when the occupant is in the forward-inclining posture and has extended their hands in the instrument panel 31 direction, and a tendency of the output value based on electrostatic capacitance detected by each of the sensor electrodes at that time. Also in the case where it has been determined that the occupant is in the forward-inclining posture, the "large" state detection signal is outputted from the sensor electrodes 11 to 13 and the "medium" state detection signal is outputted from the sensor electrode 14, similarly to in the case where it has been determined that the occupant in not in the forward-inclining posture.

Therefore, when the output value of the detection signal outputted from the sensor electrodes 11 to 13 is the "large" state and the output value of the detection signal outputted from the sensor electrode 14 is the "medium" state, the posture detection unit 252 determines a state where the occupant has their hands extended in the instrument panel 31 direction. On the other hand, when the output value of the detection signal outputted from the sensor electrodes 11 to 14 is the "small" state, the posture detection unit 252 determines a state where the occupant is not extending their hands in the instrument panel 31 direction. Furthermore, in the case where the output value of the sensor electrodes 15 to 17 installed in the seatback surface 33 is "small", the output value of the sensor electrodes 11 to 13 is "large", and the output value of the sensor electrode 14 is "medium" or "large", the posture detection unit 252, although unable to determine as far as discrimination of hand and head, determines that the posture of the occupant is the forward-inclining posture.

[3-2. Operation of Head Determination Unit]

Figure 29:
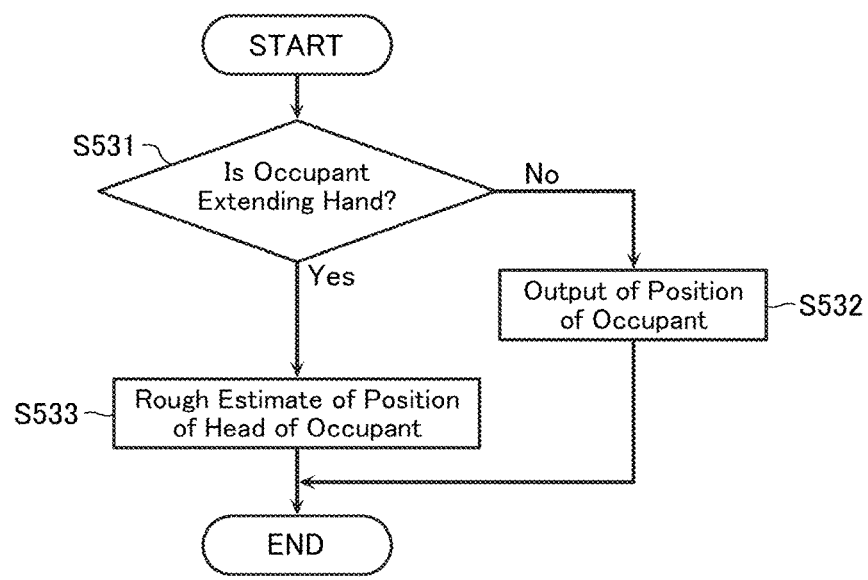
FIG. 29 is a flowchart for explaining a head determination method according to the same embodiment.

Next, operation of the head determination unit 253 will be described in detail. As mentioned above, the head determination unit 253 determines whether the position outputted from the position detection unit 251 is the position of the head of the occupant, based on the posture of the occupant outputted from the posture detection unit 252. In the present embodiment, as shown in FIG. 29, the head determination unit 253 determines whether the occupant is extending their hands in the instrument panel 31 direction or not (step S531), and if the occupant was not extending their hands in the instrument panel 31 direction, outputs the position of the occupant outputted from the position detection unit 251 as the position of the head of the occupant (step S532). On the other hand, if the occupant was extending their hands in the instrument panel 31 direction, it outputs the position of the head of the occupant roughly estimating based on whether the occupant is in the forward-inclining posture or not (step S533). Rough estimation of the position of the head of the occupant may be performed based on output of the sensor electrodes 15 to 19, and it is also possible, for example, that in the case where it has been determined that the occupant is not in the forward-inclining position, the position of the head of the occupant is determined to be in close proximity to a headrest. Moreover, in step S533, it is also possible to output only information of being in the forward-inclining posture or not, without roughly estimating the position of the head of the occupant.

Other Embodiments

Detector (First Detector)

In the above-described embodiments of the present invention, the sensor electrodes 11 to 14 were disposed on the instrument panel 31 and an A pillar 32, as the detector (first detector), but the sensor electrodes 11 to 14 may be disposed in close proximity (for example, close proximity of about 30 cm) to the airbag which is a target of airbag deployment control. That is, the airbag need only be disposed within the occupant position detectable range (for example, about 30 cm) of three or more of the sensor electrodes. In the case of a front airbag, they may be disposed in close proximity to a dashboard or a windshield 33 of a roof, in close proximity to the windshield 33 and a front door, and so on, or in the case of a side airbag, they may be disposed in close proximity to the seat, in close proximity to a door, on a roof in close proximity to the door, on a B pillar, and so on. Furthermore, it is possible to dispose them on the steering, door, roof, side glass, and so on, according to a position where the airbag is disposed. Note that the instrument panel 31 also includes the likes of a meter unit, a door handle, navigation, an air conditioner, and so on, installed in the instrument panel 31. Moreover, the roof also includes the likes of a handle, illumination, a sun visor, and so on, installed in the roof. Similarly, the pillar or door also include equipment installed respectively therein.

Furthermore, the sensor electrodes 11 to 14 may adopt a structure in which they are integrated with an interior material of each unit, or may be disposed on the inside of an external material. Moreover, they may also be attached to the internal material.

Moreover, when they are installed in the likes of the windshield or glass of the door, they may be coated on the glass using a transparent electrode, or they may be attached to the glass.

[Second Detector]

Figure 30:
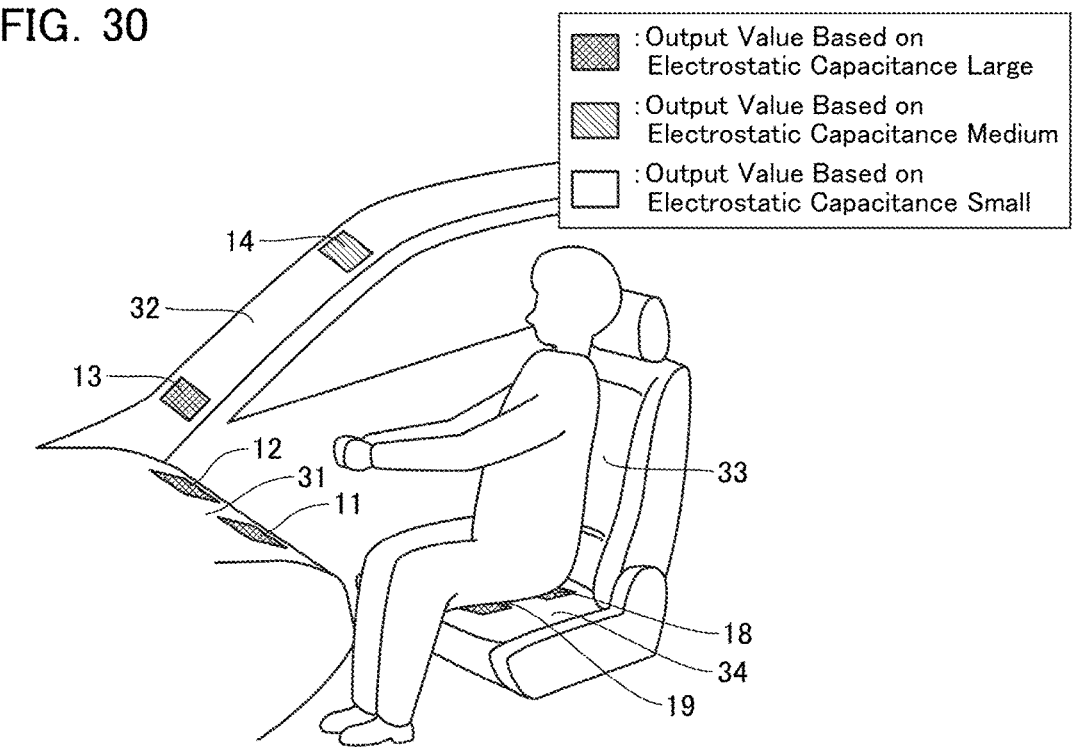
FIG. 30 is a perspective view for explaining a computation method of the posture of the occupant, according to another embodiment.
Figure 31:
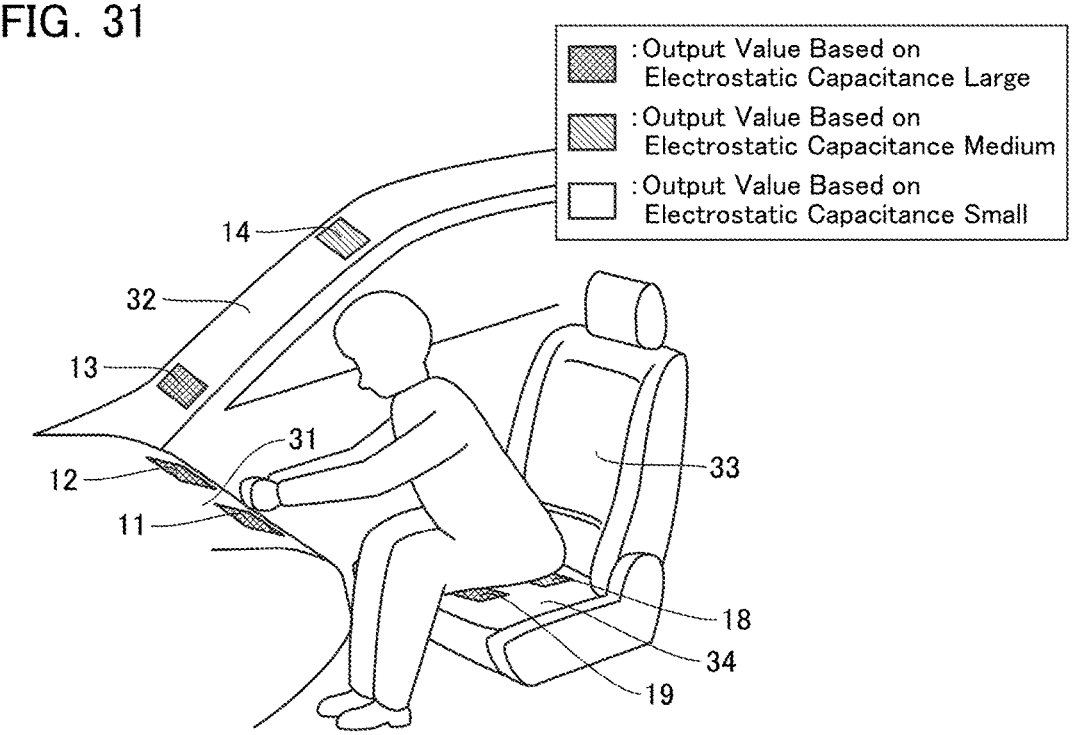
FIG. 31 is a perspective view for explaining the same method.

In the above-described embodiments, the sensor electrodes 15 to 17 were installed in the seatback surface 33 and the sensor electrodes 18 and 19 were installed in the seat seating surface 34, as the second detector, but the number or disposition of sensor electrodes can of course be appropriately changed. For example, it is also conceivable to dispose three or four sensor electrodes on the seat seating surface 34 to more highly precisely detect the posture of the occupant from a distribution of their respective output values based on electrostatic capacitance. Moreover, as shown in FIGS. 30 and 31, in the case where determination of the forward-inclining posture is performed based on the detection signals outputted from the sensor electrodes 18 and 19 installed in the seat seating surface 34, the sensor electrode need not be provided in the seatback surface 33.

[Electrostatic Capacitance Detection Circuit 22]

In the above-described embodiments of the present invention, the detection signals outputted from the sensor electrodes 11 to 14 were processed by one electrostatic capacitance detection circuit 22, but it is also possible to provide one electrostatic capacitance detection circuit 22 for each sensor electrode.

[Computation of Occupant Position]

In the above-described embodiments of the present invention, combinations of sensor electrodes for specifying plane 1 to plane 3 are respectively selected, but it is of course also possible to use different combinations, and an optimal combination can be determined by a position where the sensor electrode is installed or an automobile indoor structure. Moreover, by further combining a plurality of groups of three factors to make a comparison employing a plurality of calculation results of coordinates, it is possible to further raise precision of detection coordinates.

Moreover, in the above-described embodiments, four sensor electrodes were employed to detect the head position of the occupant, but combinations of factors may be respectively decided by three sensor electrodes or by five or more sensor electrodes. Furthermore, it is also possible to employ trigonometry or the like as the computation method of the occupant position.

What is claimed is:

1. An occupant position detection device disposed inside a vehicle to detect a position of an occupant, the occupant position detection device including:
    a first detector comprising two or more first sensor electrodes disposed forward of a seat and at least one second sensor electrode disposed at a position more rearward and higher than the first sensor electrodes, the first detector outputting detection signals each corresponding to the respective first and second sensor electrodes, based on a distance between each of the sensor electrodes and the occupant; and
    a computation unit inputted with the detection signals to compute an occupant position, the computation unit selecting from the detection signals outputted from the first detector at least three different pairs of the detection signals, and calculating a ratio or difference for each of the at least three pairs of the detection signals,
    wherein the computation unit specifies at least three surfaces each including the occupant position and each located between the respective pairs of the sensor electrodes, by using at least three of the calculated ratios or differences, calculates an intersection position of the at least three surfaces, and calculates the occupant position based on the calculated intersection position.

2. The occupant position detection device according to claim 1, wherein the two or more first sensor electrodes disposed forward of the seat include:
    at least one sensor electrode disposed on a forward left side of the seat; and
    at least one sensor electrode disposed on a forward right side of the seat.

3. The occupant position detection device according to claim 2, wherein
    disposed on the forward left side or the forward right side of the seat are two or more sensor electrodes whose height position or forward-rearward position are different.

4. The occupant position detection device according to claim 1, wherein
    the sensor electrodes of the first detector is disposed on any of an instrument panel, a steering, a pillar, a door, a roof, a windshield, and a side glass.

5. The occupant position detection device according to claim 1, wherein
    a region for detecting the position of the occupant is divided into a plurality of areas, and
    the computation unit
    specifies the area where the occupant is positioned from among the plurality of areas based on the detection signals,
    determines a condition of computation of the occupant position based on the specified area, and
    selects from the detection signals outputted from the first detector at least three different pairs of the detection signals, based on the determined condition, calculates a ratio or difference for each of the at least three pairs of the detection signals, and computes the occupant position based on at least three of the calculated ratios or differences of the detection signals.

6. The occupant position detection device according to claim 5, wherein
    the computation unit selects the detection signal used in calculation of the occupant position based on the area.

7. The occupant position detection device according to claim 6, wherein
    the computation unit employs at least the detection signal outputted from the sensor electrode closest to the area where the occupant is positioned, to compute the occupant position.

8. The occupant position detection device according to claim 1, wherein
    only in the case that the detection signal or a physical quantity found from the detection signal is in a certain range, does the computation unit employ said detection signal to compute the occupant position.

9. The occupant position detection device according to claim 8, wherein
    the computation unit employs the detection signal whose output is a certain threshold value or less, of the plurality of detection signals based on the plurality of sensor electrodes, to compute the occupant position.

10. The occupant position detection device according to claim 8, wherein
    in the case that an amplitude of a certain detection signal exceeds the certain threshold value, an amplification degree for the certain detection signal is lowered, and
    in the case that the amplitude of the certain detection signal exceeds the certain threshold value after the amplitude degree is lowered, the certain detection signal is not used in computation of the occupant position.

11. The occupant position detection device according to claim 1, further comprising:
    a second detector disposed on at least one of a seatback surface and a seating surface and outputting a second detection signal,
    wherein the computation unit detects the position and a posture of the occupant based on the detection signals and the second detection signal.

12. The occupant position detection device according to claim 11, wherein the computation unit
    detects the position of the occupant based on the detection signals, and
    detects the posture of the occupant based on the detection signals and the second detection signal.

13. The occupant position detection device according to claim 11, wherein the computation unit determines whether the position of the occupant is a position of a head of the occupant or not, based on the posture of the occupant.

14. An airbag deployment control system, comprising:
    the occupant position detection device described in claim 1;
    an airbag disposed in a range in which an occupant position is detectable by the occupant position detection device, to deploy during a collision of a vehicle; and an airbag deployment control device that performs deployment control of the airbag according to the occupant position computed by the occupant position detection device.

15. The occupant position detection device according to claim 1, wherein the surfaces are flat surfaces.

* * * * *